(12) United States Patent
Sasaki et al.

(10) Patent No.: US 6,927,939 B2
(45) Date of Patent: Aug. 9, 2005

(54) THIN-FILM MAGNETIC HEAD AND METHOD OF MANUFACTURING SAME

(75) Inventors: Yoshitaka Sasaki, Milpitas, CA (US); Doug Crandell, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 196 days.

(21) Appl. No.: 10/354,009

(22) Filed: Jan. 30, 2003

(65) Prior Publication Data

US 2005/0073773 A1 Apr. 7, 2005

(51) Int. Cl.⁷ .............................. G11B 5/147; G11B 5/17
(52) U.S. Cl. ...................................... 360/126; 360/123
(58) Field of Search ................................. 360/126, 123; 29/603.07, 603.14, 603.15, 603.23–60

(56) References Cited

U.S. PATENT DOCUMENTS

| | | | |
|---|---|---|---|
| 6,043,959 A | | 3/2000 | Crue et al. |
| 6,191,916 B1 | | 2/2001 | Sasaki |
| 6,317,288 B1 | * | 11/2001 | Sasaki .......................... 360/126 |
| 6,646,828 B1 | * | 11/2003 | Sasaki .......................... 360/126 |
| 6,674,610 B1 | * | 1/2004 | Thomas et al. .............. 360/123 |
| 6,680,815 B2 | * | 1/2004 | Sasaki .......................... 360/126 |
| 6,742,241 B1 | * | 6/2004 | Sasaki ........................ 29/603.07 |

FOREIGN PATENT DOCUMENTS

JP      A 11-283215      10/1999

* cited by examiner

Primary Examiner—Robert S. Tupper
(74) Attorney, Agent, or Firm—Oliff & Berridge, PLC

(57) ABSTRACT

A thin-film magnetic head comprises a bottom pole layer, a top pole layer, a recording gap layer, and a thin-film coil. The thin-film magnetic head further comprises a coupling portion which is located away from an air bearing surface and establishes coupling between the bottom pole layer and the top pole layer. The coupling portion has an end face facing toward the air bearing surface. The end face includes a curved surface convex toward the medium facing surface. A part of the thin-film coil, which is disposed between the end face and the air bearing surface, has a minimum width of the thin-film coil in a position on a virtual line connecting the end face and the air bearing surface in the shortest distance, and increases in width with distance from the virtual line.

17 Claims, 30 Drawing Sheets

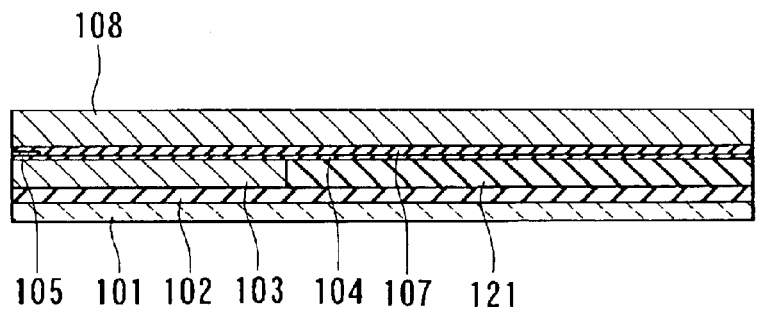 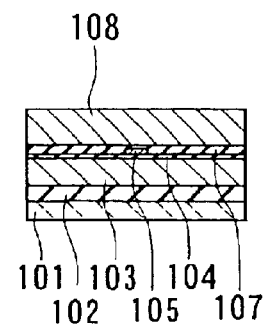
FIG. 3A  FIG. 3B
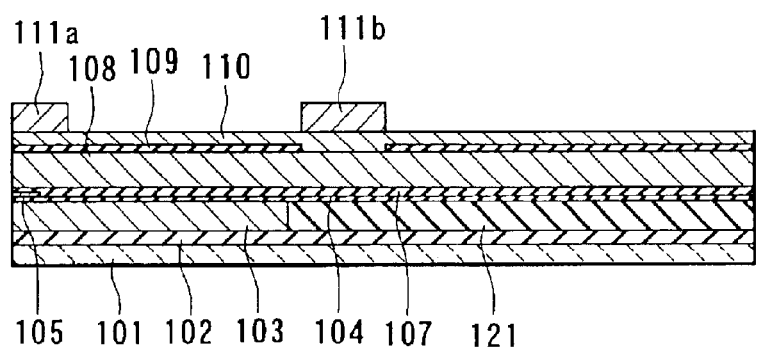 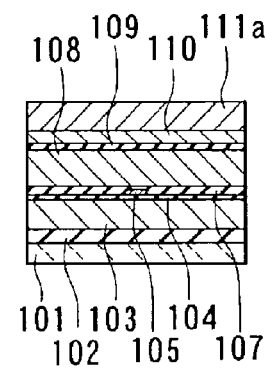
FIG. 4A  FIG. 4B
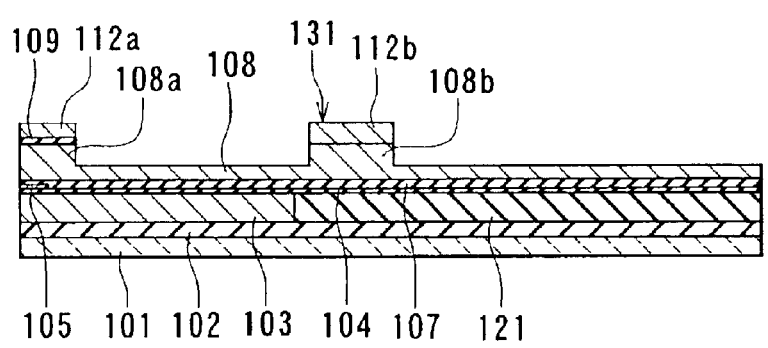 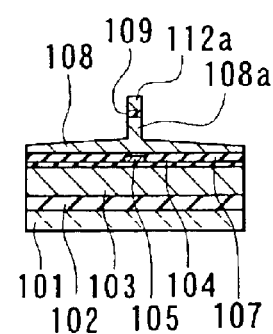
FIG. 5A  FIG. 5B

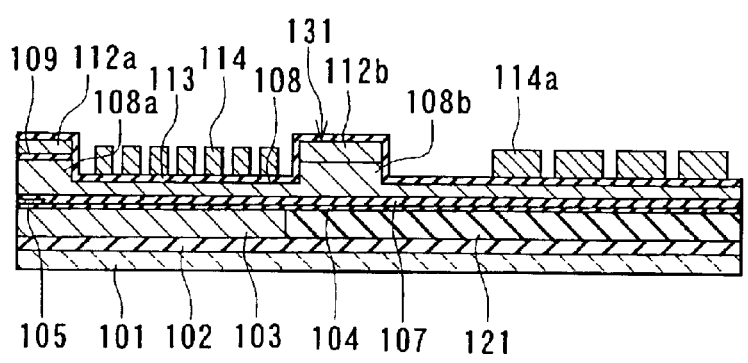
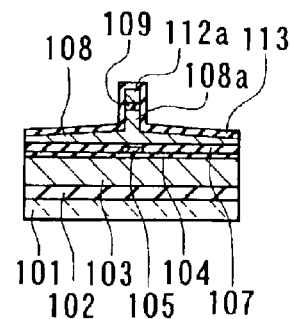
FIG. 6A
FIG. 6B
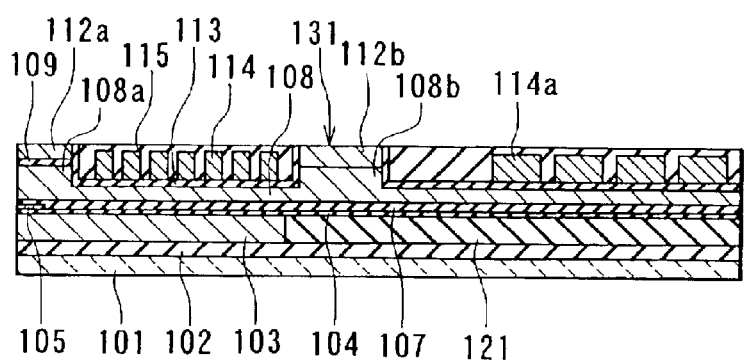
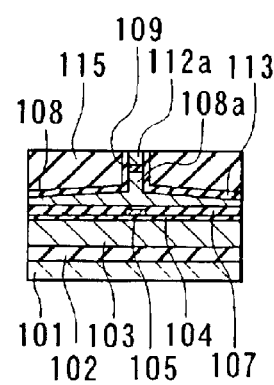
FIG. 7A
FIG. 7B

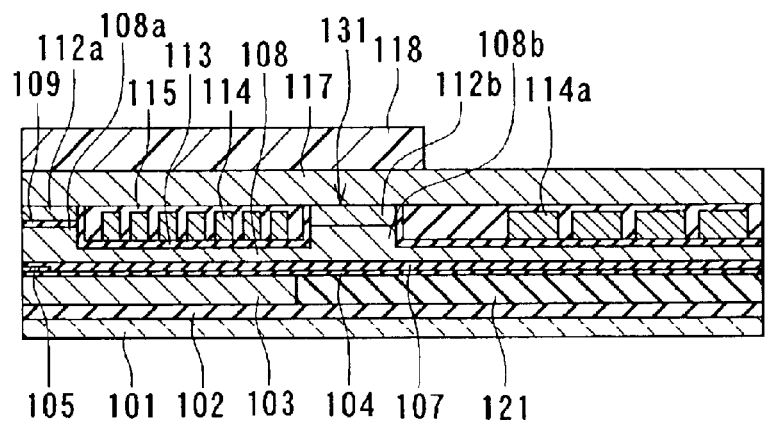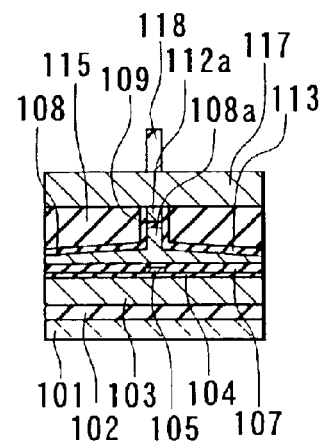
FIG. 8A　　　　　　　　FIG. 8B
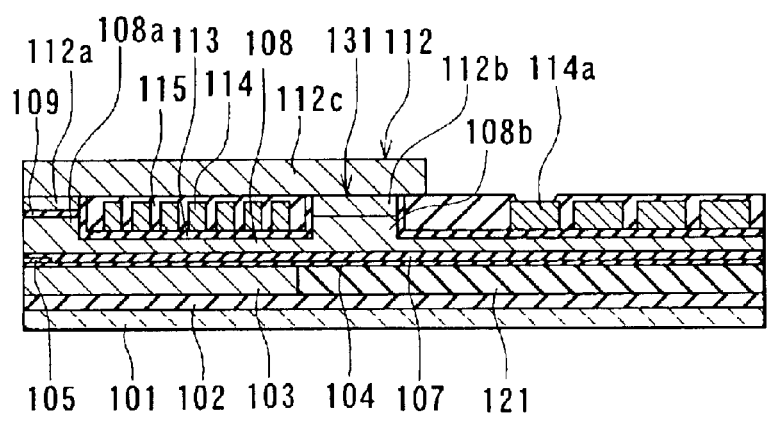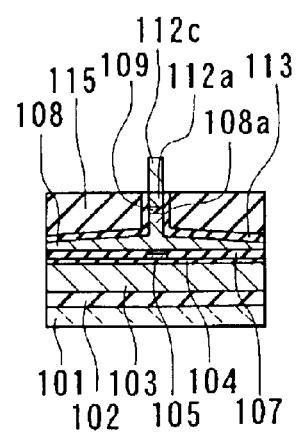
FIG. 9A　　　　　　　　FIG. 9B

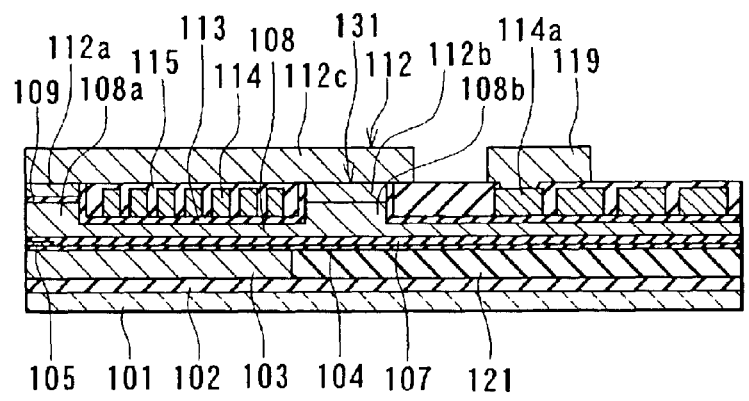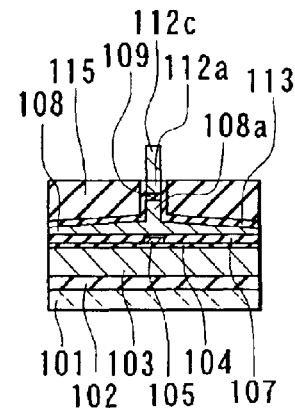
FIG. 10A          FIG. 10B
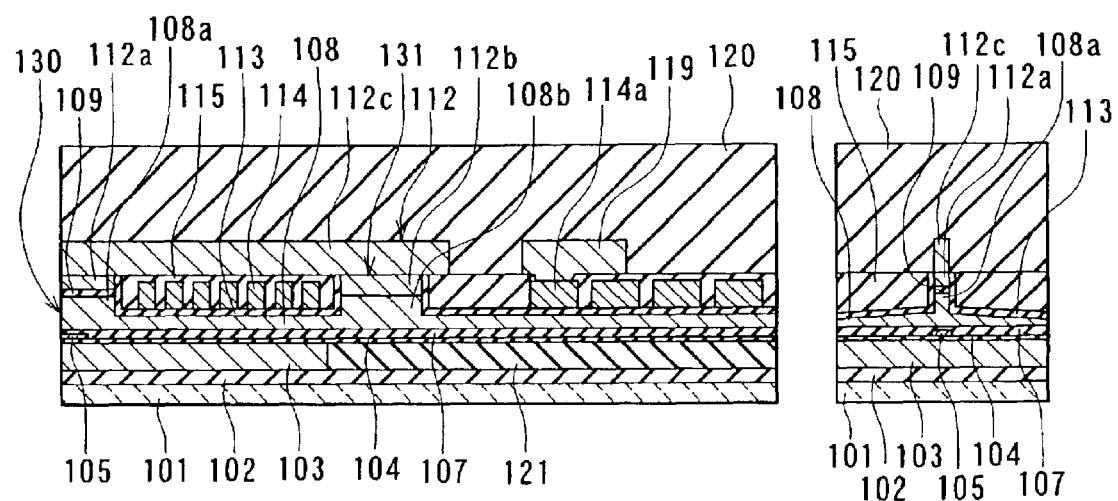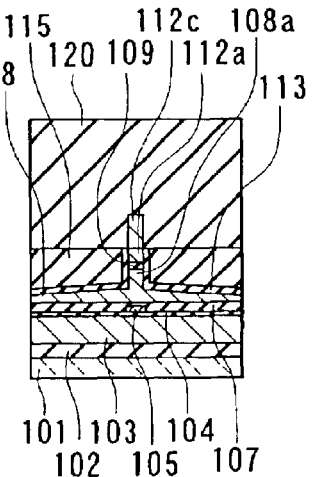
FIG. 11A          FIG. 11B

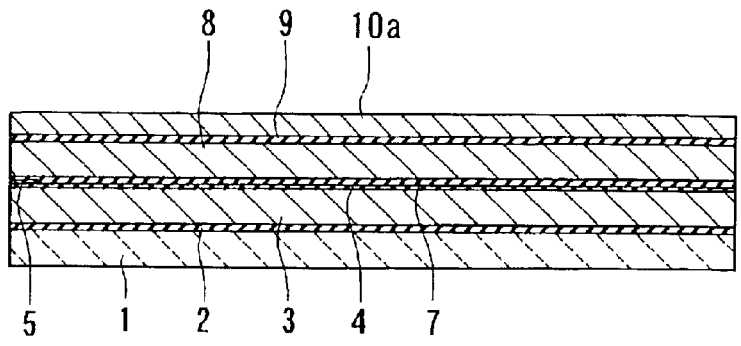 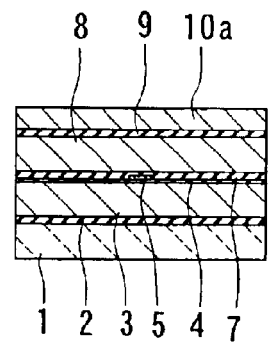
FIG. 24A　　　　　　　FIG. 24B
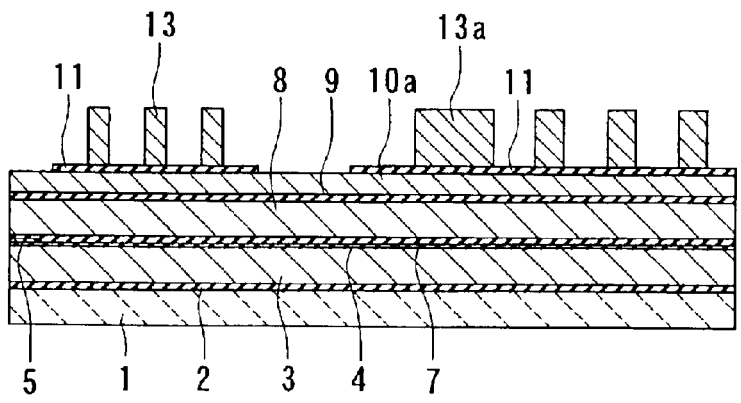 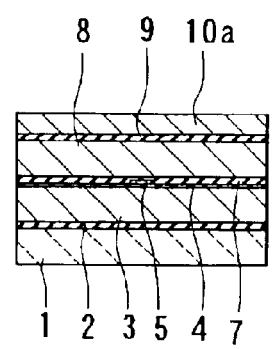
FIG. 25A　　　　　　　FIG. 25B
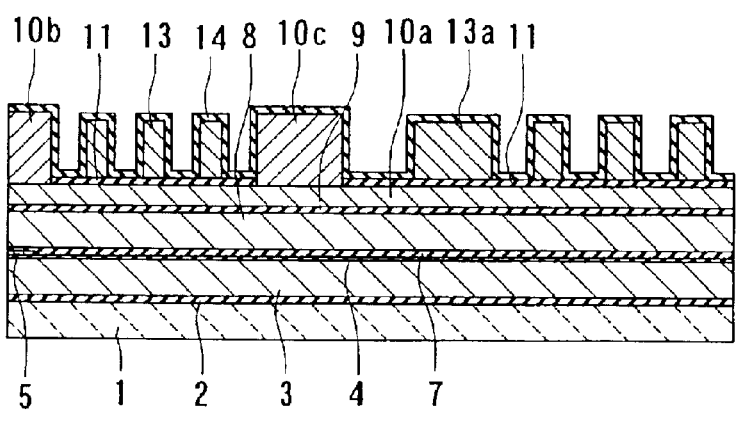 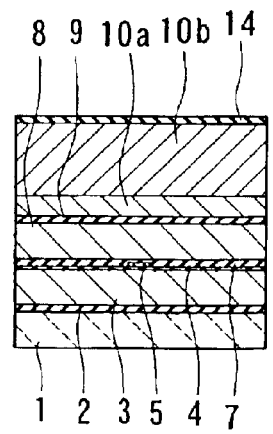
FIG. 26A　　　　　　　FIG. 26B

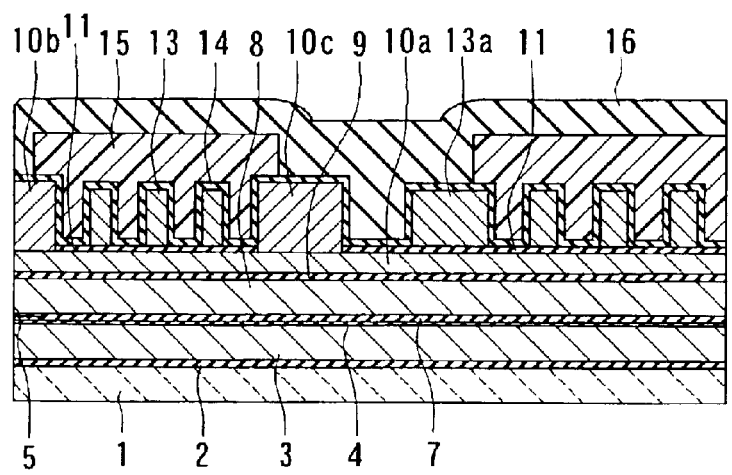
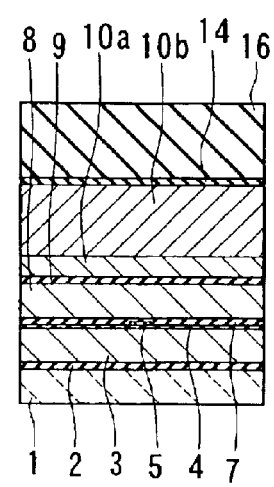
FIG. 27A　　　　　　FIG. 27B
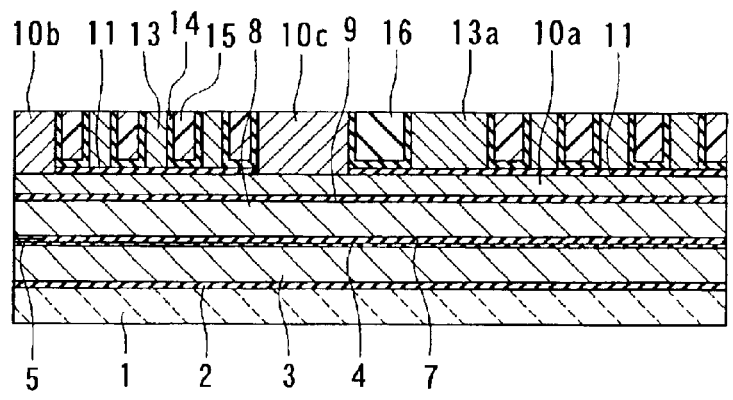
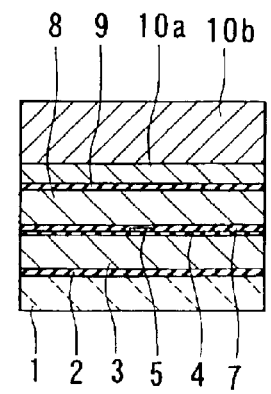
FIG. 28A　　　　　　FIG. 28B

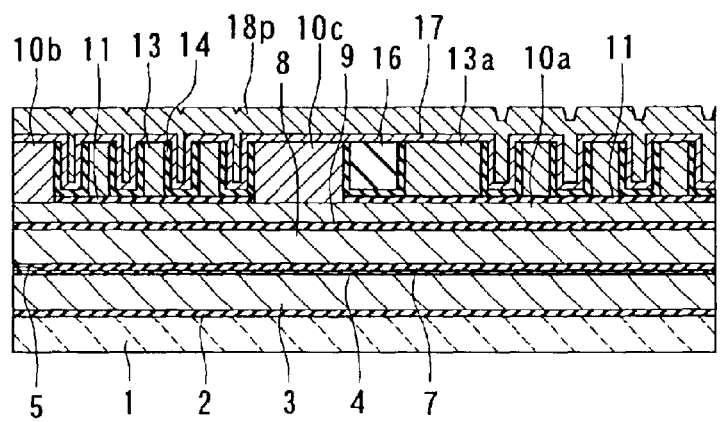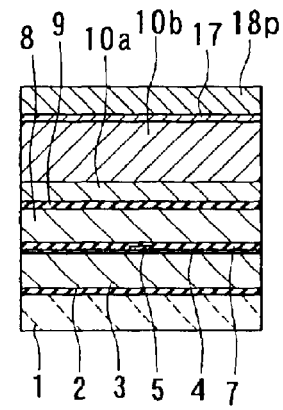
FIG. 29A  FIG. 29B
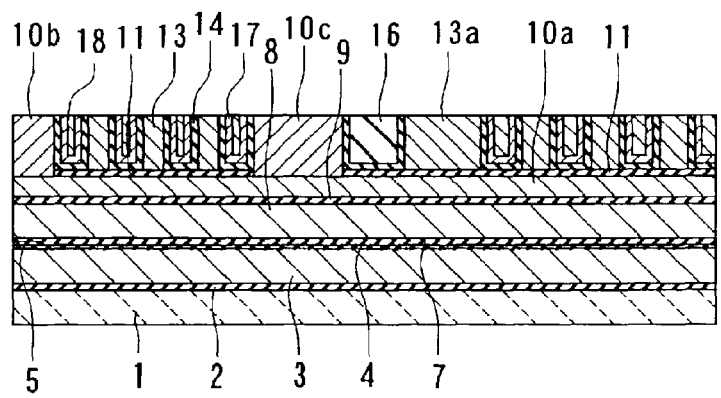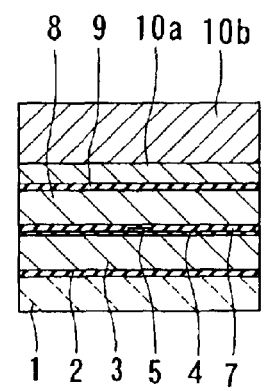
FIG. 30A  FIG. 30B

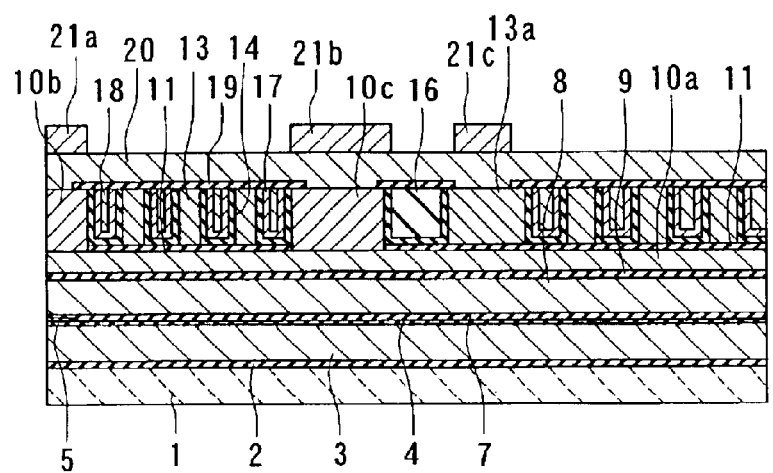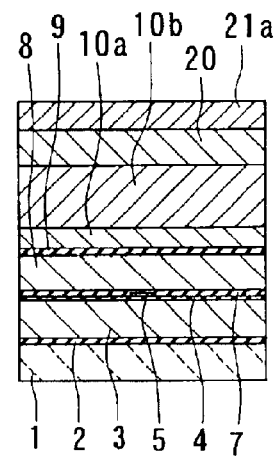
FIG. 31A  FIG. 31B
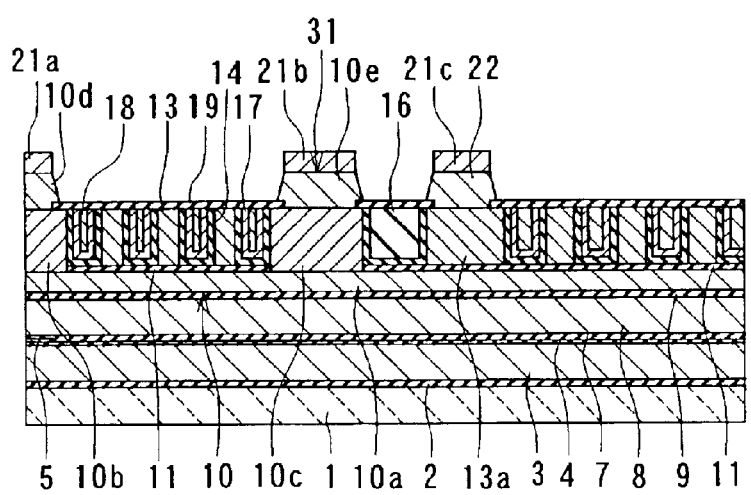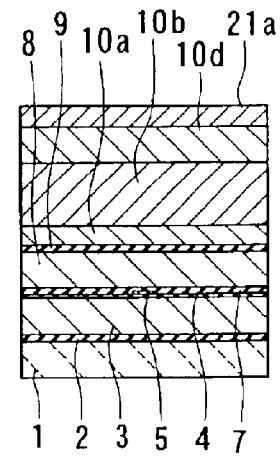
FIG. 32A  FIG. 32B

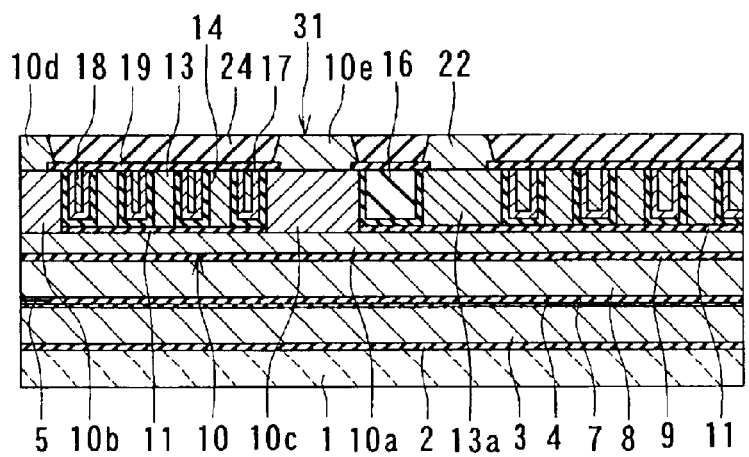
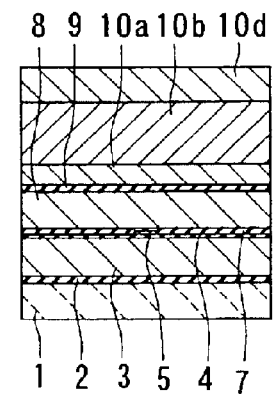
FIG. 33A
FIG. 33B
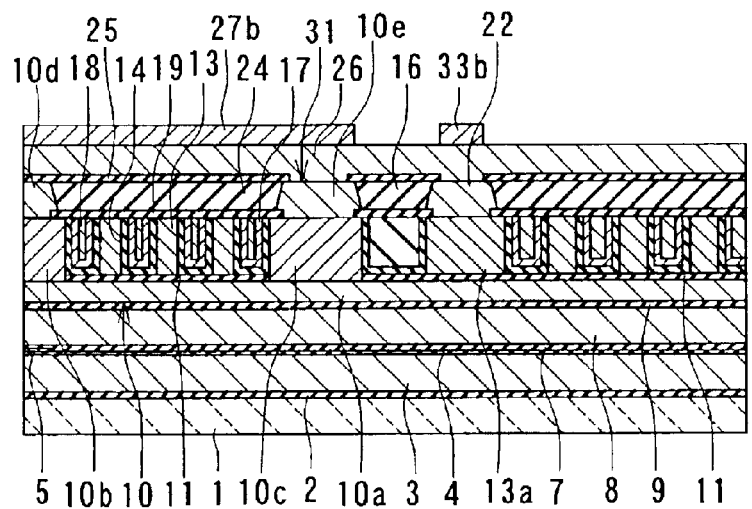
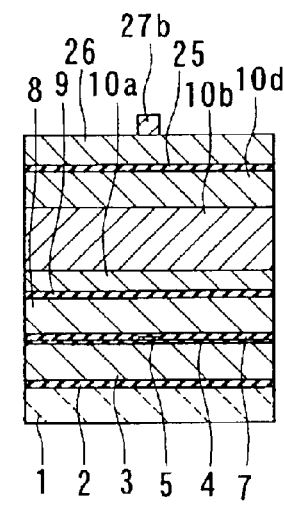
FIG. 34A
FIG. 34B

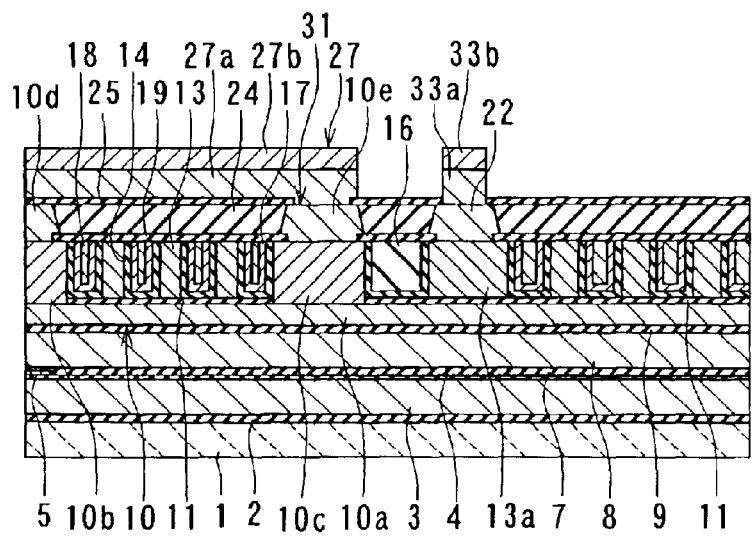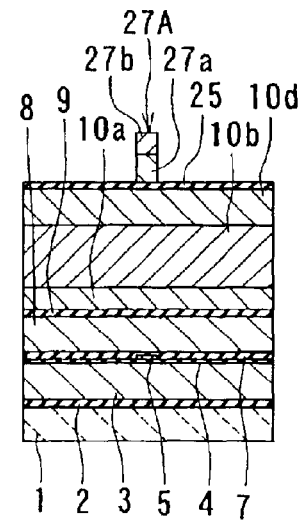
FIG. 35A  FIG. 35B
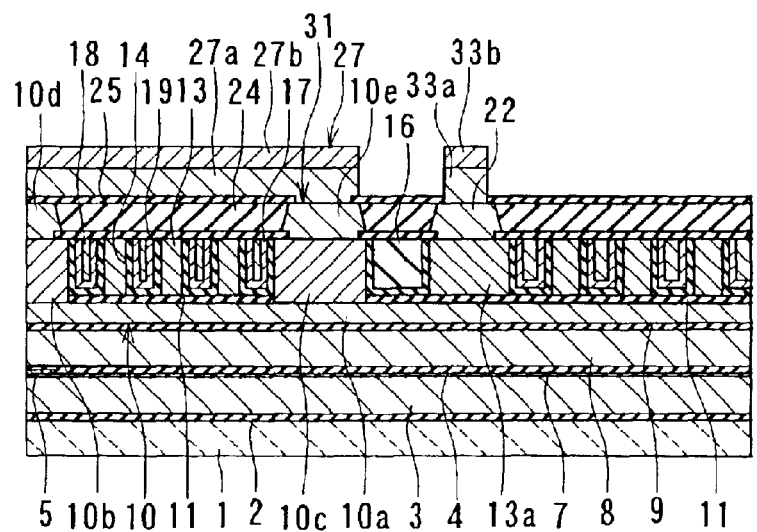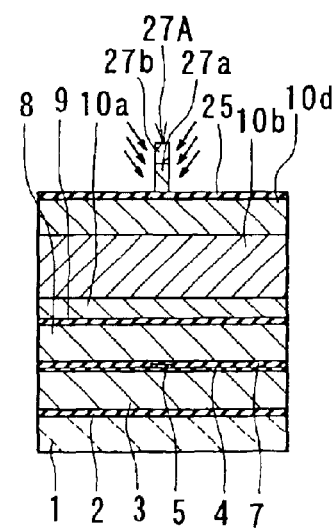
FIG. 36A  FIG. 36B

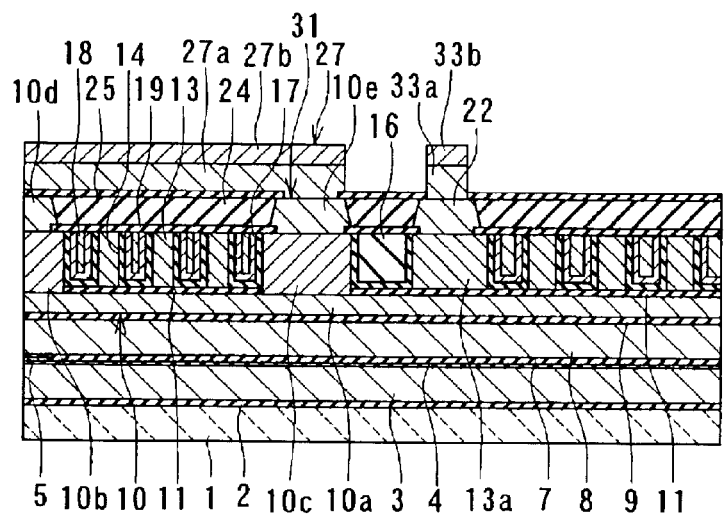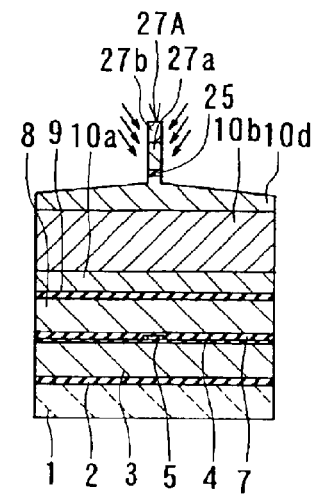
FIG. 37A  FIG. 37B
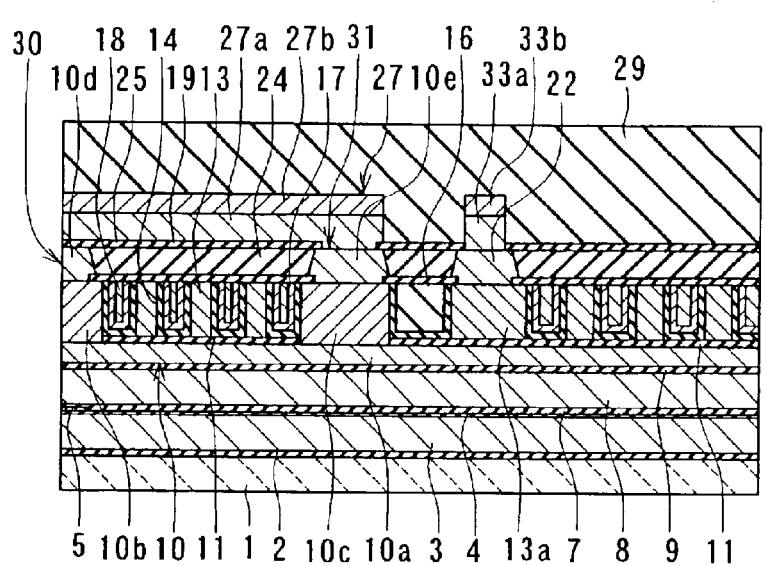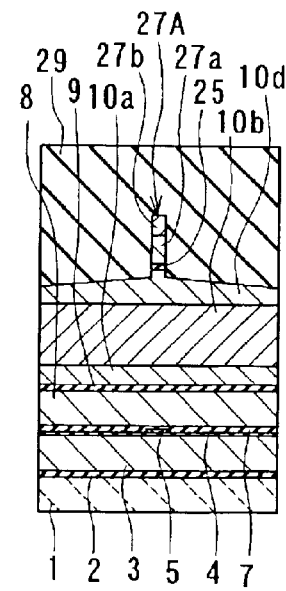
FIG. 38A  FIG. 38B

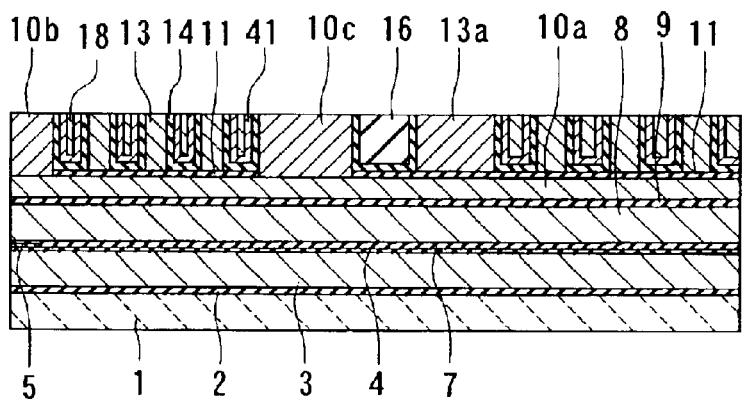
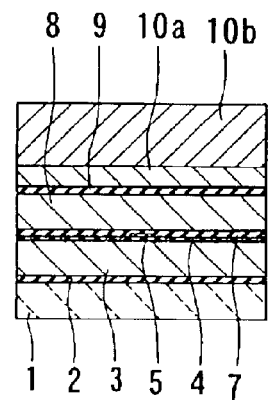
FIG. 43A
FIG. 43B
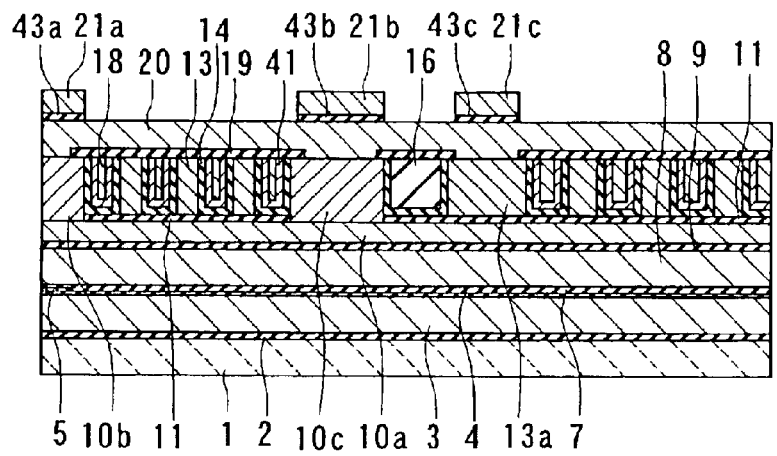
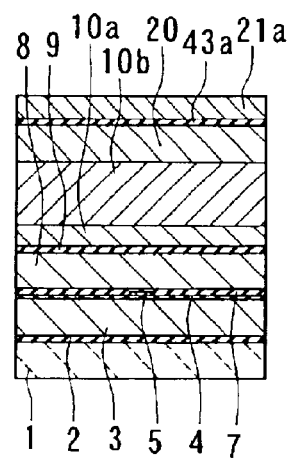
FIG. 44A
FIG. 44B

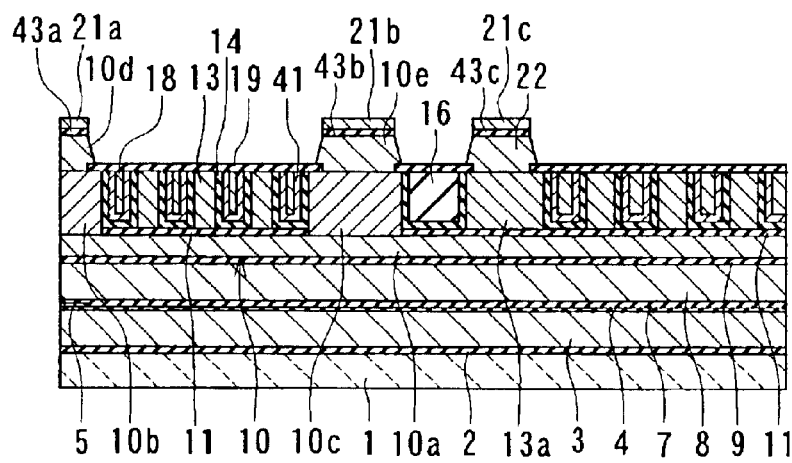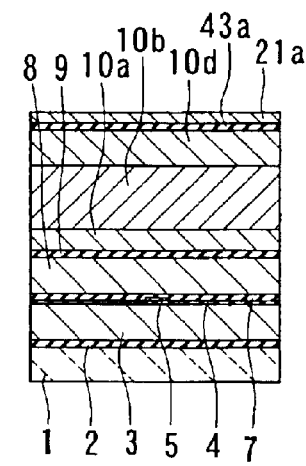
FIG. 45A
FIG. 45B
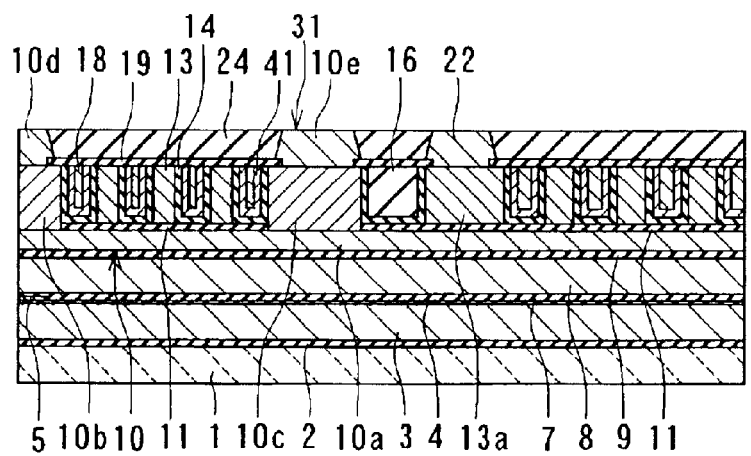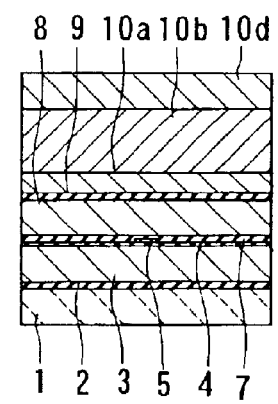
FIG. 46A
FIG. 46B

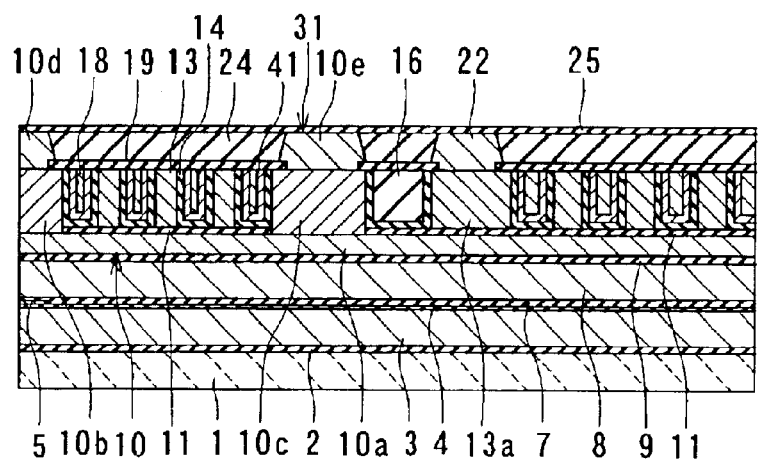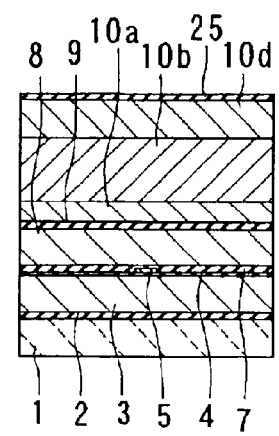
FIG. 47A  FIG. 47B
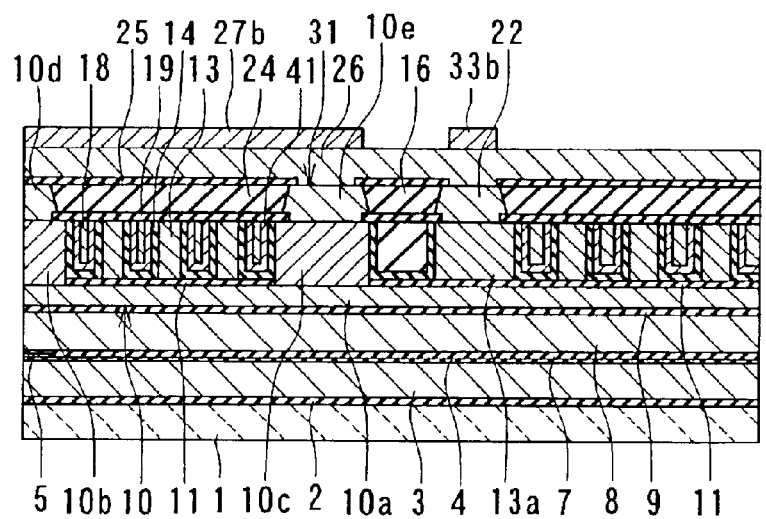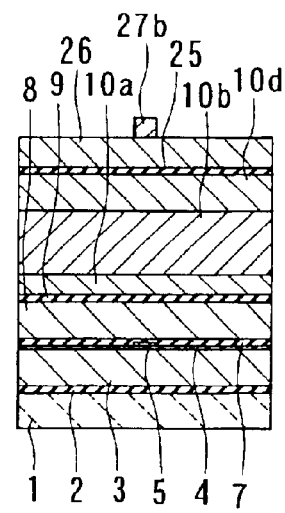
FIG. 48A  FIG. 48B

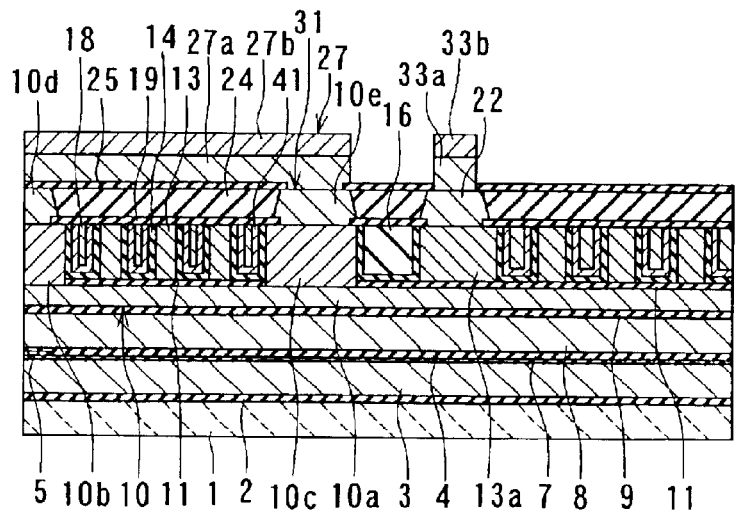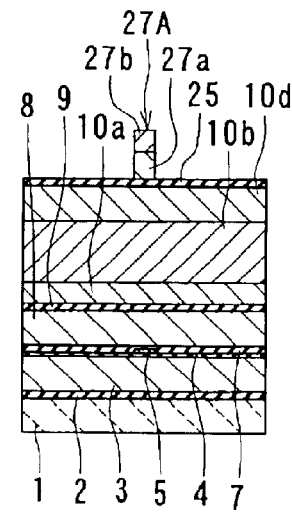
FIG. 49A  FIG. 49B
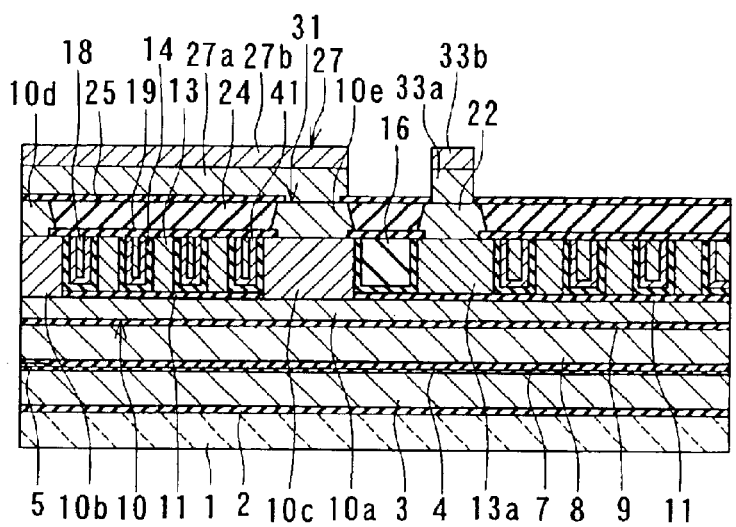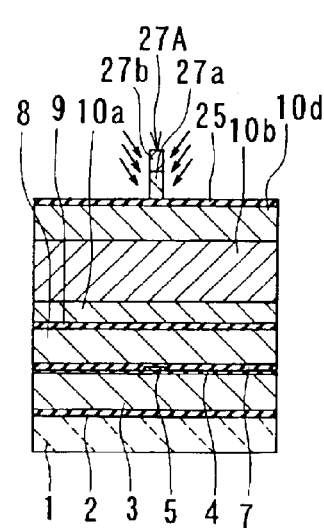
FIG. 50A  FIG. 50B

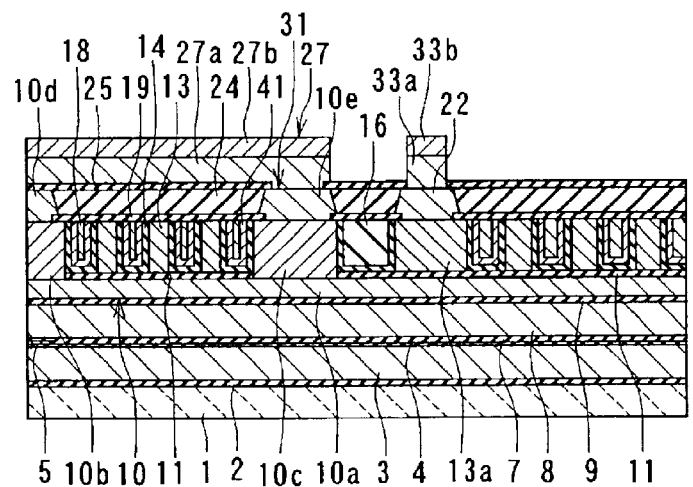
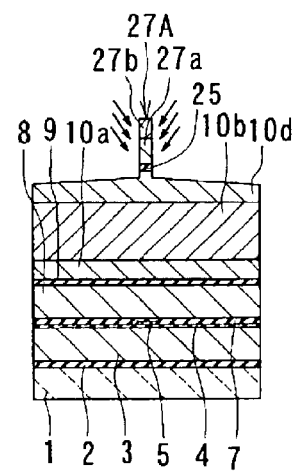
FIG. 51A FIG. 51B
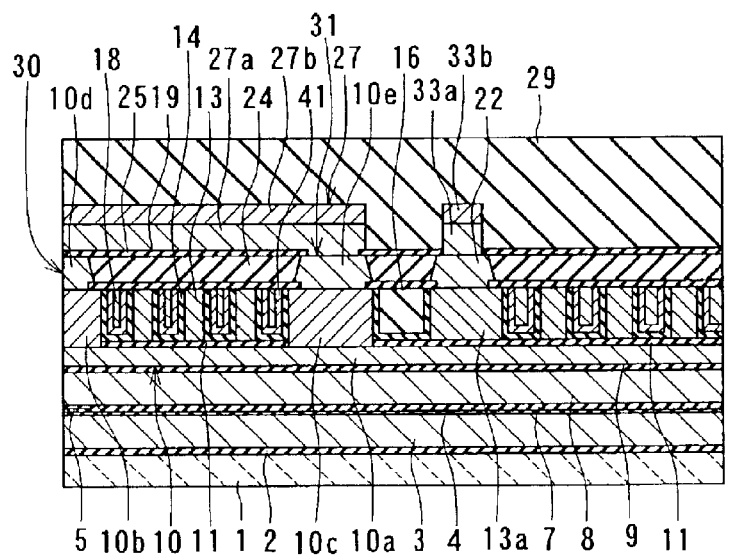
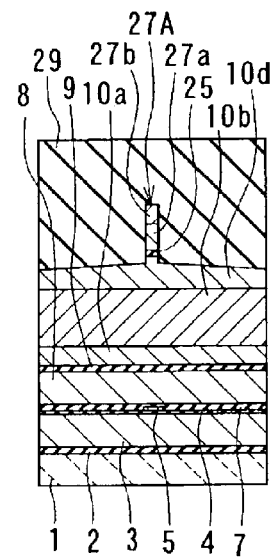
FIG. 52A FIG. 52B

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type electromagnetic transducer, and a method of manufacturing same.

2. Description of the Related Art

Recent years have seen significant improvements in the areal recording density of hard disk drives. In particular, areal recording densities of latest hard disk drives reach 80 to 100 GB/platter and are even on a pace to exceed that level. Thin-film magnetic heads are required of improved performance accordingly.

Among the thin-film magnetic heads, widely used are composite thin-film magnetic heads made of a layered structure including a recording head having an induction-type electromagnetic transducer for writing and a reproducing head having a magnetoresistive element (that may be hereinafter called an MR element) for reading.

In general, a recording head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers. In the typical recording head, the bottom pole layer and the top pole layer are magnetically coupled to each other via a coupling portion which is located away from the medium facing surface. The thin-film coil has the shape of a flat spiral, being disposed around the coupling portion.

Higher track densities on a recording medium are essential to enhancing the recording density among the performances of a recording head. To achieve this, it is required to implement a recording head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve such a structure.

As the track width decreases, it becomes harder to generate a high-density magnetic flux between the two magnetic pole portions that are opposed to each other with the recording gap layer in between. On that account, it is desirable that the magnetic pole portions be made of a magnetic material having a higher saturation flux density.

When the frequency of the recording signal is raised to increase the recording density, recording heads require an improvement in the speed of change of flux, or equivalently, a reduction in flux rise time. The recording heads also require less degradation in such recording characteristics as an overwrite property and non-linear transition shift at high frequency bands. For improved recording characteristics at high frequency bands, the magnetic path length is preferably made smaller. The magnetic path length is determined chiefly by the length of a portion of the bottom or top pole layer lying between the coupling portion and the medium facing surface (referred to as yoke length in the present application). A reduction in yoke length is effective at reducing the magnetic path length. The yoke length is effectively reduced by decreasing the winding pitch of the thin-film coil, or the pitch of a portion of the winding which lies between the coupling portion and the medium facing surface, in particular.

One of known techniques for decreasing the winding pitch of a thin-film coil is to form a recess in the bottom pole layer so as to place the thin-film coil in the recess (see the specification of U.S. Pat. No. 6,043,959).

According to the method of manufacturing a thin-film magnetic head described in U.S. Pat. No. 6,043,959, the bottom pole layer, the top pole layer, and the thin-film coil are formed through the following steps. Initially, the bottom pole layer patterned into a predetermined shape is formed. A recording gap layer and a magnetic layer are then formed on the bottom pole layer in succession. Part of the magnetic layer is coupled to the bottom pole layer. Then, a mask is formed to cover portions of the magnetic layer where to form the magnetic pole portion of the top pole layer and where to form the coupling portion. The magnetic layer, the recording gap layer and the bottom pole layer are etched by using this mask. Consequently, the magnetic layer after the etching makes a pole portion layer that is to be the magnetic pole portion of the top pole layer, and a coupling layer that is to be the coupling portion. The above-mentioned etching also forms a trim structure, in which the magnetic pole portion of the top pole layer, the recording gap layer, and part of the bottom pole layer make vertical, self-aligned sidewalls. The etching also provides the bottom pole layer with a recess in which the thin-film coil is to be placed. An insulating film is then formed all over, and thereafter, the thin-film coil is formed by plating on the insulating film inside the recess. Then, a thick insulating layer is formed all over and the top surface of this insulating layer is flattened to expose the pole portion layer and the coupling layer of the top pole layer. On the flattened surface, a yoke portion layer of the top pole layer is formed so that the pole portion layer and the coupling layer are coupled to each other.

In the thin-film magnetic head described in the specification of U.S. Pat. No. 6,043,959, an end of the coupling portion closer to the medium facing surface has a part that extends linearly in parallel with the medium facing surface.

Another known technique for decreasing the winding pitch of the thin-film coil is to arrange the winding of a second coil in a winding gap of a first coil (see the specification of U.S. Pat. No. 6,191,916 B1).

In the thin-film magnetic head described in the specification of U.S. Pat. No. 6,043,959, the end of the coupling portion closer to the medium facing surface has the part that extends linearly in parallel with the medium facing surface. In this thin-film magnetic head, the thin-film coil has a plurality of conductor portions (hereinafter referred to as linear conductor portions) that are arranged between the coupling portion and the medium facing surface so as to extend linearly in parallel with the medium facing surface. To reduce the yoke length of this thin-film magnetic head, the linear conductor portions must be made smaller in width. The longer the linear conductor portions are, the higher the resistance of the entire thin-film coil becomes. The shorter the linear conductor portions, the lower the resistance of the entire thin-film coil.

As described above, thin-film magnetic heads desirably have smaller yoke lengths for the sake of improved recording characteristics at high frequency bands. It is therefore effective to reduce the pitch of the portion of the thin-film coil winding which lies between the coupling portion and the medium facing surface. In conventional thin-film magnetic heads, however, a reduction in the above-mentioned pitch can decrease the width of the linear conductor portions and thus increase the resistance of the linear conductor portions. Since the conventional thin-film magnetic heads have linear conductor portions of relatively greater lengths, the resistance of the linear conductor portions occupies a considerable portion of the resistance of the entire thin-film coil, e.g., 60–70%. Under the circumstances, the conventional thin-film magnetic heads have had the problem that the thin-film coil increases in resistance when the yoke length is reduced to improve the recording characteristics at high frequency bands.

For improved recording characteristics of the thin-film magnetic heads, it is also desirable to increase the number of turns of the thin-film coil. Nevertheless, if the yoke length is reduced as described above and the number of turns of the thin-film coil is increased at the same time, the conventional thin-film magnetic heads become yet smaller in the width of the linear conductor portions with further increases in the resistance of the linear conductor portions and the resistance of the entire thin-film coil.

As the resistance of the thin-film coil increases, there arises a problem that the magnetic pole portions can protrude toward the recording medium due to heat occurring from the thin-film coil so that the magnetic pole portions are more likely to collide with the recording medium.

Thus, in the conventional thin-film magnetic heads, it has been unfeasible to reduce the yoke length considerably from the viewpoint of avoiding the problem that occurs from an increase in the resistance of the thin-film coil.

As mentioned above, for the sake of improved recording characteristics of the thin-film magnetic heads, it is also desirable to increase the number of turns of the thin-film coil. In the conventional thin-film magnetic heads, however, the turns of winding of the thin-film coil increase in length of the linear conductor portions as the turns are closer to the outer periphery of the winding. Thus, when the number of turns of the thin film coil is increased, the thin-film coil becomes greater in resistance as well as in the area which the thin-film coil occupies. The increase in the area makes it difficult to obtain smaller thin-film magnetic heads.

In the conventional thin-film magnetic heads, the width of the linear conductor portions must be reduced for the sake of a smaller yoke length. As the width of the linear conductor portions decreases, however, it becomes difficult to form the linear conductor portions with precision, as will be discussed later.

In general, the thin-film coil is formed by frame plating through the following steps. Initially, a photoresist frame is formed by photolithography. Then, a thin electrode film is formed to cover this frame. With an electric current passed through this electrode film, the thin-film coil is formed by electroplating. When the thin-film coil is to be formed in a recess of the bottom pole layer, the frame must be formed on the uneven bottom pole layer. When the frame is formed by photolithography on such an uneven base, rays of light used for exposure of photolithography are reflected off the electrode film lying on the sidewalls of the recess. The photoresist is exposed to the reflected rays as well. For that reason, it is difficult to form a fine frame precisely on an uneven base by photolithography.

Consequently, for example, if a thin-film coil having a thickness of 1.5 μm or more and having linear conductor portions of 0.3 μm or less in width or 0.5 μm or less in pitch is to be formed in the recess of the bottom pole layer by the existing photolithography techniques, the yield of the thin-film coil becomes extremely low, and therefore it is practically difficult to form such a coil.

The technology described in the specification of U.S. Pat. No. 6,191,916 B1 can be used to reduce the spacing between adjoining windings. The thin-film magnetic head described in the specification of U.S. Pat. No. 6,191,916 B1, however, has thin-film coils of constant winding widths. In this thin-film magnetic head, the thin-film coils can thus increase in resistance when the winding widths are reduced for the sake of a smaller yoke length.

OBJECT AND SUMMARY OF THE INVENTION

It is an object of the invention to provide a thin-film magnetic head which is small in magnetic path length and thus excellent in recording characteristics at high frequency bands and which also has a thin-film coil of small resistance, and a method of manufacturing the same.

A thin-film magnetic head of the invention comprises:

a medium facing surface that faces toward a recording medium;

first and second pole layers that include magnetic pole portions opposed to each other and located in regions of the pole layers on a side of the medium facing surface:

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil of flat spiral shape, disposed around the coupling portion, at least part of the thin-film coil being interposed between the first and second pole layers and insulated from the first and second pole layers.

In the thin-film magnetic head of the invention the coupling portion has an end face facing toward the medium facing surface, and this end face includes a curved surface convex toward the medium facing surface. A part of the thin-film coil is disposed between the end face of the coupling portion and the medium facing surface, and has a minimum width of the thin-film coil in a position on a virtual line connecting the end face of the coupling portion and the medium facing surface in the shortest distance. The part of the thin-film coil includes a variable width portion that increases in width with distance from the virtual line. Consequently, according to the thin-film magnetic head of the invention, it is possible to reduce the resistance of the thin-film coil while shortening the magnetic path length.

In the thin-film magnetic head of the invention, the end face of the coupling portion may have a shape of a part of a cylindrical surface. A length of the coupling portion in a direction perpendicular to the medium facing surface may be greater than a width of the coupling portion.

In the thin-film magnetic head of the invention, an inner periphery and an outer periphery of the variable width portion may both be shaped into an arc, and the outer periphery may be greater than the inner periphery in the radius of curvature.

In the thin-film magnetic head of the invention, the thin-film coil may have four or more turns. In this case the first turn and the second turn of the thin-film coil from the inner side may include a first portion and a second portion, respectively, the first and second portions being disposed between the end face of the coupling portion and the medium facing surface. Of the first portion and the second portion, at least the first portion may become minimum in width in the position on the virtual line connecting the end face of the coupling portion and the medium facing surface in the shortest distance, and increase in width with distance from the virtual line.

An inner periphery of the first portion may have a shape of an arc having a first radius of curvature; an outer periphery of the first portion may have a shape of an arc having a second radius of curvature greater than the first radius of curvature; an inner periphery of the second portion may have a shape of an arc having a third radius of curvature greater than the second radius of curvature; and an outer periphery of the second portion may have a shape of an arc having a fourth radius of curvature greater than the third radius of curvature.

Alternatively, an inner periphery of the first portion may have a shape of an arc having a first radius of curvature; an outer periphery of the first portion may have a shape of an arc having a second radius of curvature greater than the first radius of curvature; an inner periphery of the second portion may have a shape of an arc having a third radius of curvature greater than the second radius of curvature; and an outer periphery of the second portion may include a linear portion and two arc portions connected to respective ends of the linear portion, the linear portion being located in a predetermined region covering the position on the virtual line, the two arc portions having a fourth radius of curvature greater than the third radius of curvature.

Alternatively, an inner periphery of the first portion may have a shape of an arc having a first radius of curvature; an outer periphery of the first portion may include a first linear portion and two arc portions connected to respective ends of the first linear portion, the first linear portion being located in a predetermined region covering the position on the virtual line, the two arc portions having a second radius of curvature greater than the first radius of curvature; an inner periphery of the second portion may include a second linear portion and two arc portions connected to respective ends of the second linear portion, the second linear portion being located in a predetermined region covering the position on the virtual line, the two arc portions having a third radius of curvature greater than the second radius of curvature; and an outer periphery of the second portion may include a third linear portion and two arc portions connected to respective ends of the third linear portion, the third linear portion being located in a predetermined region covering the position on the virtual line, the two arc portions having a fourth radius of curvature greater than the third radius of curvature. The second linear portion may have a length greater than or equal to that of the first linear portion, and the third linear portion may be longer than the second linear portion.

When the thin-film coil has four or more turns, each of the turns of the thin-film coil other than the first turn from the inner side may include a portion of constant width located in a predetermined region covering the position on the virtual line, and, the outer the turns are, the longer the portions of constant width may be.

Moreover, when the thin-film coil has four or more turns, each of the turns of the thin-film coil other than the first and second turns from the inner side may include a portion of constant width located in a predetermined region covering the position on the virtual line, and, the outer the turns are, the longer the portions of constant width may be.

In the thin-film magnetic head of the invention, the second pole layer may have a pole portion layer including the magnetic pole portion of the second pole layer, a coupling layer including at least part of the coupling portion, and a yoke portion layer for coupling the pole portion layer and the coupling layer, and, the part of the thin-film coil may be disposed between the pole portion layer and the coupling layer.

In the thin-film magnetic head of the invention, the first pole layer may have a first layer opposed to the thin-film coil, a second layer connected to the first layer near the medium facing surface, and a third layer connected to the first layer, the third layer including at least part of the coupling portion, and, the part of the thin-film coil may be disposed between the second layer and the third layer. In this case, the thin-film coil may include a first coil having a winding disposed in part between the second layer and the third layer, and a second coil having a winding disposed at least in part in a winding gap of the first coil. The second pole layer may be a flat layer.

A thin-film magnetic head manufactured by a first method of manufacturing a thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil of flat spiral shape, disposed around the coupling portion, at least part of the thin-film coil being interposed between the first and second pole layers and insulated from the first and second pole layers.

The first method of manufacturing a thin-film magnetic head of the invention comprises the steps of:

forming the first pole layer;

forming the thin-film coil on the first pole layer;

forming the gap layer on the magnetic pole portion of the first pole layer; and forming the second pole layer on the gap layer and the thin-film coil.

In the first method of manufacturing a thin-film magnetic head of the invention, one of the step of forming the first pole layer and the step of forming the second pole layer may include the step of forming the coupling portion so that the coupling portion has an end face facing toward the medium facing surface and the end face includes a curved surface convex toward the medium facing surface. A part of the thin-film coil is disposed between the end face of the coupling portion and the medium facing surface, and has a minimum width of the thin-film coil in a position on a virtual line connecting the end face of the coupling portion and the medium facing surface in the shortest distance. The part of the thin-film coil includes a variable width portion that increases in width with distance from the virtual line. Consequently, in the thin-film magnetic head, it is possible to reduce the resistance of the thin-film coil while shortening the magnetic path length.

A thin-film magnetic head manufactured by a second method of manufacturing a thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil of flat spiral shape, disposed around the coupling portion, at least part of the thin-film coil being interposed between the first and second pole layers and insulated from the first and second pole layers.

The first pole layer has a first layer opposed to the thin-film coil, a second layer connected to the first layer near the medium facing surface, and a third layer connected to the first layer, the third layer including at least part of the coupling portion. The thin-film coil includes a first coil having a winding disposed in part between the second layer and the third layer, and a second coil having a winding disposed at least in part in a winding gap of the first coil.

The second method of manufacturing a thin-film magnetic head of the invention comprises the steps of:

forming the first layer;

forming the first coil on the first layer;

forming the second layer and the third layer on the first layer after the formation of the first coil;

forming the second coil so that the second coil is disposed at least in part in the winding gap of the first coil;

forming the gap layer; and forming the second pole layer on the gap layer, the first coil, and the second coil.

In the second method of manufacturing a thin-film magnetic head of the invention, the coupling portion has an end face facing toward the medium facing surface, and this end face includes a curved surface convex toward the medium facing surface. A part of the first coil and a part of the second coil are both disposed between the end face of the coupling portion and the medium facing surface, and have a minimum width of the thin-film coil in a position on a virtual line connecting the end face of the coupling portion and the medium facing surface in the shortest distance. The part of the first coil and the part of the second coil include respective variable width portions that increase in width with distance from the virtual line. Consequently, in the thin-film magnetic head, it is possible to reduce the resistance of the thin-film coil while shortening the magnetic path length.

Other and further objects, features and advantages of the invention will appear more fully from the following description.

BRIEF DESCRIPTION OF THE DRAWINGS

FIGS. 3A and 3B are cross sections for illustrating a step in a method of manufacturing a thin-film magnetic head according to the first embodiment of the invention.

FIGS. 4A and 4B are cross sections for illustrating a step that follows FIGS. 3A and 3B.

FIGS. 5A and 5B are cross sections for illustrating a step that follows FIGS. 4A and 4B.

FIGS. 6A and 6B are cross sections for illustrating a step that follows FIGS. 5A and 5B.

FIGS. 7A and 7B are cross sections for illustrating a step that follows FIGS. 6A and 6B.

FIGS. 8A and 8B are cross sections for illustrating a step that follows FIGS. 7A and 7B.

FIGS. 9A and 9B are cross sections for illustrating a step that follows FIGS. 8A and 8B.

FIGS. 10A and 10B are cross sections for illustrating a step that follows FIGS. 9A and 9B.

FIGS. 11A and 11B are cross sections for illustrating a step that follows FIGS. 10A and 10B.

FIGS. 24A and 24B are cross sections for illustrating a step in a method of manufacturing a thin-film magnetic head according to the second embodiment of the invention.

FIGS. 25A and 25B are cross sections for illustrating a step that follows FIGS. 24A and 24B.

FIGS. 26A and 26B are cross sections for illustrating a step that follows FIGS. 25A and 25B.

FIGS. 27A and 27B are cross sections for illustrating a step that follows FIGS. 26A and 26B.

FIGS. 28A and 28B are cross sections for illustrating a step that follows FIGS. 27A and 27B.

FIGS. 29A and 29B are cross sections for illustrating a step that follows FIGS. 28A and 28B.

FIGS. 30A and 30B are cross sections for illustrating a step that follows FIGS. 29A and 29B.

FIGS. 31A and 31B are cross sections for illustrating a step that follows FIGS. 30A and 30B.

FIGS. 32A and 32B are cross sections for illustrating a step that follows FIGS. 31A and 31B.

FIGS. 33A and 33B are cross sections for illustrating a step that follows FIGS. 32A and 32B.

FIGS. 34A and 34B are cross sections for illustrating a step that follows FIGS. 33A and 33B.

FIGS. 35A and 35B are cross sections for illustrating a step that follows FIGS. 34A and 34B.

FIGS. 36A and 36B are cross sections for illustrating a step that follows FIGS. 35A and 35B.

FIGS. 37A and 37B are cross sections for illustrating a step that follows FIGS. 36A and 36B.

FIGS. 38A and 38B are cross sections for illustrating a step that follows FIGS. 37A and 37B.

FIGS. 43A and 43B are cross sections for illustrating a step that follows FIGS. 42A and 42B.

FIGS. 44A and 44B are cross sections for illustrating a step that follows FIGS. 43A and 43B.

FIGS. 45A and 45B are cross sections for illustrating a step that follows FIGS. 44A and 44B.

FIGS. 46A and 46B are cross sections for illustrating a step that follows FIGS. 45A and 45B.

FIGS. 47A and 47B are cross sections for illustrating a step that follows FIGS. 46A and 46B.

FIGS. 48A and 48B are cross sections for illustrating a step that follows FIGS. 47A and 47B.

FIGS. 49A and 49B are cross sections for illustrating a step that follows FIGS. 48A and 48B.

FIGS. 50A and 50B are cross sections for illustrating a step that follows FIGS. 49A and 49B.

FIGS. 51A and 51B are cross sections for illustrating a step that follows FIGS. 50A and 50B.

FIGS. 52A and 52B are cross sections for illustrating a step that follows FIGS. 51A and 51B.

DETAILED DESCRIPTION OF THE PREFERRED EMBODIMENTS

Figure 1:
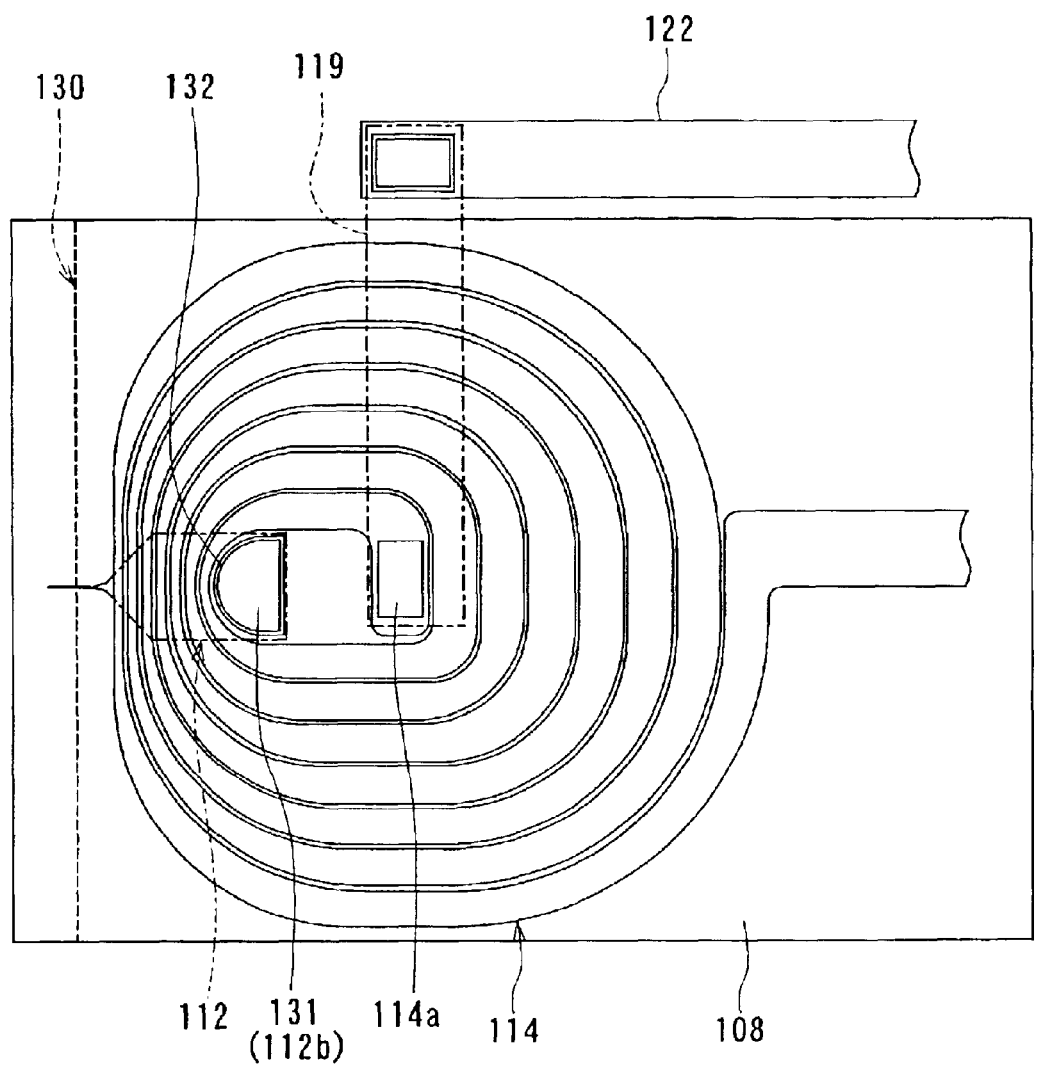
FIG. 1 is a plan view showing the shape and arrangement of a coupling portion and a thin-film coil in a first embodiment of the invention.

Embodiments of the invention will now be described in detail with reference to the accompanying drawings.

[First Embodiment]

First, a method of manufacturing a thin-film magnetic head according to a first embodiment of the invention will now be described with reference to FIGS. 3A to 11A and FIGS. 3B to 11B. FIGS. 3A to 11A are cross sections each orthogonal to the air bearing surface and the top surface of the substrate. FIGS. 3B to 11B are cross sections of the magnetic pole portion each parallel to the air bearing surface.

In the method of manufacturing the thin-film magnetic head of the present embodiment, as shown in FIGS. 3A and 3B, an insulating layer 102 made of alumina ($Al_2O_3$), for example, is first deposited to a thickness of approximately 2 to 3 µm on a substrate 101 made of aluminum oxide and titanium carbide ($Al_2O_3$—TiC), for example. Next, a bottom shield layer 103 intended for a reproducing head, made of a magnetic material such as Permalloy, is formed to a thickness of approximately 2 to 3 µm on the insulating layer 102. The bottom shield layer 103 is selectively formed on the insulating layer 102 by plating using a photoresist film as a mask, for example. Then, an insulating layer 121 made of alumina, for example, is formed all over to a thickness of 3 to 4 µm, for example. The Insulating layer 121 is then polished by, for example, chemical mechanical polishing (hereinafter referred to as CMP), to expose the bottom shield layer 103 and to flatten the surface.

On the bottom shield layer 103, a bottom shield gap film 104 serving as an insulating film is formed to a thickness of approximately 20 to 35 nm, for example. On the bottom shield gap film 104, an MR element 105 for magnetic signal detection is formed to a thickness of tens of nanometers. For example, the MR element 105 may be formed by selectively etching an MR film formed by sputtering. The MR element 105 is located near a region where to form an air bearing surface to be described later. The MR element 105 may be an element utilizing a magnetosensitive film that exhibits magnetoresistivity, such as an AMR element, a GMR element or a TMR (tunnel magnetoresistive) element. Next, although not shown, a pair of electrode layers to be electrically connected to the MR element 105 are formed to a thickness of tens of nanometers on the bottom shield gap film 104. Then, a top shield gap film 107 serving as an insulating film is formed to a thickness of approximately 20 to 35 nm, for example, on the bottom shield gap film 104 and the MR element 105. The MR element 105 is embedded in the shield gap films 104 and 107. Examples of insulating materials to be used for the shield gap films 104 and 107 include alumina, aluminum nitride, and diamond-like carbon (DLC). The shield gap films 104 and 107 may be formed by sputtering or chemical vapor deposition (hereinafter referred to as CVD).

Next, a bottom pole layer 108 intended for a recording head, made of a magnetic material, is selectively formed on the top shield gap film 107 to a thickness of approximately 3 µm. This bottom pole layer 108 also functions as a top shield layer for the reproducing head. Next, although not shown, an insulating layer made of alumina, for example, is formed all over to a thickness of 4 to 5 µm, for example. The resultant is polished by, for example, CMP to expose the bottom pole layer 108, and to flatten the surface.

Next, as shown in FIGS. 4A and 4B, a recording gap, layer 109 of an insulating material such as alumina is formed on the bottom pole layer 108 to a thickness of 100 nm, for example. Then, a contact hole is formed in the recording gap layer 109 at a position where the bottom pole layer 108 and a top pole layer to be described later are coupled to each other.

Next, a magnetic film 110 of high saturation flux density material is formed all over to a thickness of, for example, 0.5 to 1.0 μm by sputtering. Masks 111a and 111b made of Permalloy, for example, are formed on the magnetic film 110 by frame plating. The mask 111a is located in a position corresponding to a pole portion layer of the top pole layer to be described later. The mask 111b is located in a position corresponding to a coupling layer of the top pole layer to be described later.

Next, as shown in FIGS. 5A and 5B, the magnetic film 110 is etched, for example, by reactive ion etching using the masks 111a and 111b. Consequently, the magnetic film 110 remaining in the position corresponding to the mask 111a makes the pole portion layer 112a. The magnetic film 110 remaining in the position corresponding to the mask 111b makes the coupling layer 112b. The pole portion layer 112a includes the magnetic pole portion of the top pole layer.

Next, the recording gap layer 109 and the bottom pole layer 108 are etched, for example, by ion beam etching, using the pole portion layer 112a and the coupling layer 112b as masks. This forms a magnetic pole portion 108a, which is a part of the bottom pole layer 108, under the pole portion layer 112a via the recording gap layer 109, and also forms a bottom coupling portion 108b, a part of the bottom pole layer 108, under the coupling layer 112b. The foregoing etching also forms a trim structure in which the magnetic pole portion of the top pole layer (pole portion layer 112a), the recording gap layer 109, and the magnetic pole portion 108a of the bottom pole layer 108 make vertical, self-aligned sidewalls. The trim structure suppresses an increase in the effective recording track width due to expansion of a magnetic flux generated during writing in a narrow track. The bottom coupling portion 108b and the coupling layer 112b constitute a coupling portion 131 for establishing magnetic coupling between the bottom pole layer 108 and the top pole layer. By the foregoing etching, a recess to place a thin-film coil in is formed in the bottom pole layer 108. Incidentally, the masks 111a and 111b are removed by the etching of the magnetic film 110, the recording gap layer 109 and the bottom pole layer 108.

Next, as shown in FIGS. 6A and 6B, an insulating film 113 of alumina, for example, is formed all over. A thin-film coil 114 made of Cu, for example, is then formed on the insulating film 113 in the foregoing recess by frame plating. Here, although not shown, a lead layer to be connected to the thin-film coil 114 is formed at the same time. The lead layer is disposed outside the bottom pole layer 108. The lead layer is made of the same material as that of the thin-film coil 114. In FIGS. 6A and 6B, the reference numeral 114a represents a connecting portion of the thin-film coil 114 which is connected to the lead layer via a connecting layer to be described later.

Next, as shown in FIGS. 7A and 7B, a thick insulating layer 115 made of alumina, for example, is formed all over. The top surface of the insulating layer 115 is flattened, for example, by CMP and the pole portion layer 112a and the coupling layer 112b are exposed.

Next, as shown in FIGS. 8A and 8B, a magnetic film 117 of a magnetic material is formed all over by sputtering. A mask 118 made of photoresist, for example, is formed on the magnetic film 117. The mask 118 is intended for the formation of a yoke portion layer to be described later.

Next, as shown in FIGS. 9A and 9B, the magnetic film 117 is etched, for example, by reactive ion etching using the mask 118. Consequently, the magnetic film 117 remaining in the position corresponding to the mask 118 makes the yoke portion layer 112c. The yoke portion layer 112c connects the pole portion layer 112a and the coupling layer 112b. In this way, the top pole layer 112 made up of the pole portion layer 112a, the coupling layer 112b and the yoke portion layer 112c is formed.

Next, a part of the insulating layer 115 lying over the connecting portion 114a of the thin-film coil 114 is selectively removed by etching to form a contact hole.

Next, as shown in FIGS. 10A and 10B, a connecting layer 119 is formed of a conductive material. The connecting layer 119 is connected to the not-shown lead layer and to the connecting portion 114a of the thin-film coil 114 through the contact hole formed in the insulating layer 115.

Next, as shown in FIGS. 11A and 11B, an overcoat layer 120 made of alumina, for example, is formed all over. Its surface is flattened and not-shown electrode pads are formed thereon. Finally, a slider including the foregoing layers is lapped to form the air bearing surface 130. A thin-film magnetic head including the recording and reproducing heads is thereby completed.

The thin-film magnetic head according to the present embodiment has the air bearing surface 130 serving as a medium facing surface that faces toward a recording medium, and the reproducing head and the recording head (induction-type electromagnetic transducer). The reproducing head comprises: the MR element 105 located near the air bearing surface 130; the bottom shield layer 103 and the top shield layer (bottom pole layer 108) for shielding the MR element 105, portions of the bottom and top shield layers located on a side of the air bearing surface 130 being opposed to each other with the MR element 105 in between; the bottom shield gap film 104 located between the MR element 105 and the bottom shield layer 103; and the top shield gap film 107 located between the MR element 105 and the top shield layer.

The recording head comprises: the bottom pole layer 108 and the top pole layer 112 magnetically coupled to each other and including the magnetic pole portions that are opposed to each other and located in regions of the pole layers on the side of the air bearing surface 130; the recording gap layer 109 interposed between the magnetic pole portion of the bottom pole layer 108 and the magnetic pole portion of the top pole layer 112; and the thin-film coil 114, at least part of which is interposed between the bottom and top pole layers 108. 112 and insulated from the bottom and top pole layers 108, 112. The bottom pole layer 108 and the top pole layer 112 of the embodiment correspond to the first pole layer and the second pole layer of the invention, respectively.

The bottom pole layer 108 includes the magnetic pole portion 108a and the bottom coupling portion 108b. The top pole layer 112 has: the pole portion layer 112a that includes the magnetic pole portion of the top pole layer 112; the coupling layer 112b; and the yoke portion layer 112c for connecting the pole portion layer 112a and the coupling layer 112b.

The bottom coupling portion 108b and the coupling layer 112b constitute the coupling portion 131 for establishing magnetic coupling between the bottom pole layer 108 and the top pole layer 112. This coupling portion 131 is located away from the air bearing surface 130.

The thin-film coil 114 has the shape of a flat spiral, being disposed around the coupling portion 131. Part of the thin film coil 114 is disposed between the pole portion layer 112a and the coupling layer 112b.

Hereinafter, description will be given in detail of a shape and arrangement of the coupling portion 131 and the thin-film coil 114 according to the present embodiment. FIG. 1 is a plan view showing a shape and arrangement of the coupling portion 131 and the thin-film coil 114 in the present embodiment. Note that FIG. 1 shows the state before the air bearing surface 130 is formed by lapping. FIG. 1 also shows a lead layer 122. The connecting layer 119 establishes connection between this lead layer 122 and the connecting portion 114a of the thin-film coil 114. As shown in FIG. 1, the thin-film coil 114 has four or more turns. By way of example, FIG. 1 shows a thin-film coil 114 of seven turns.

Figure 2:
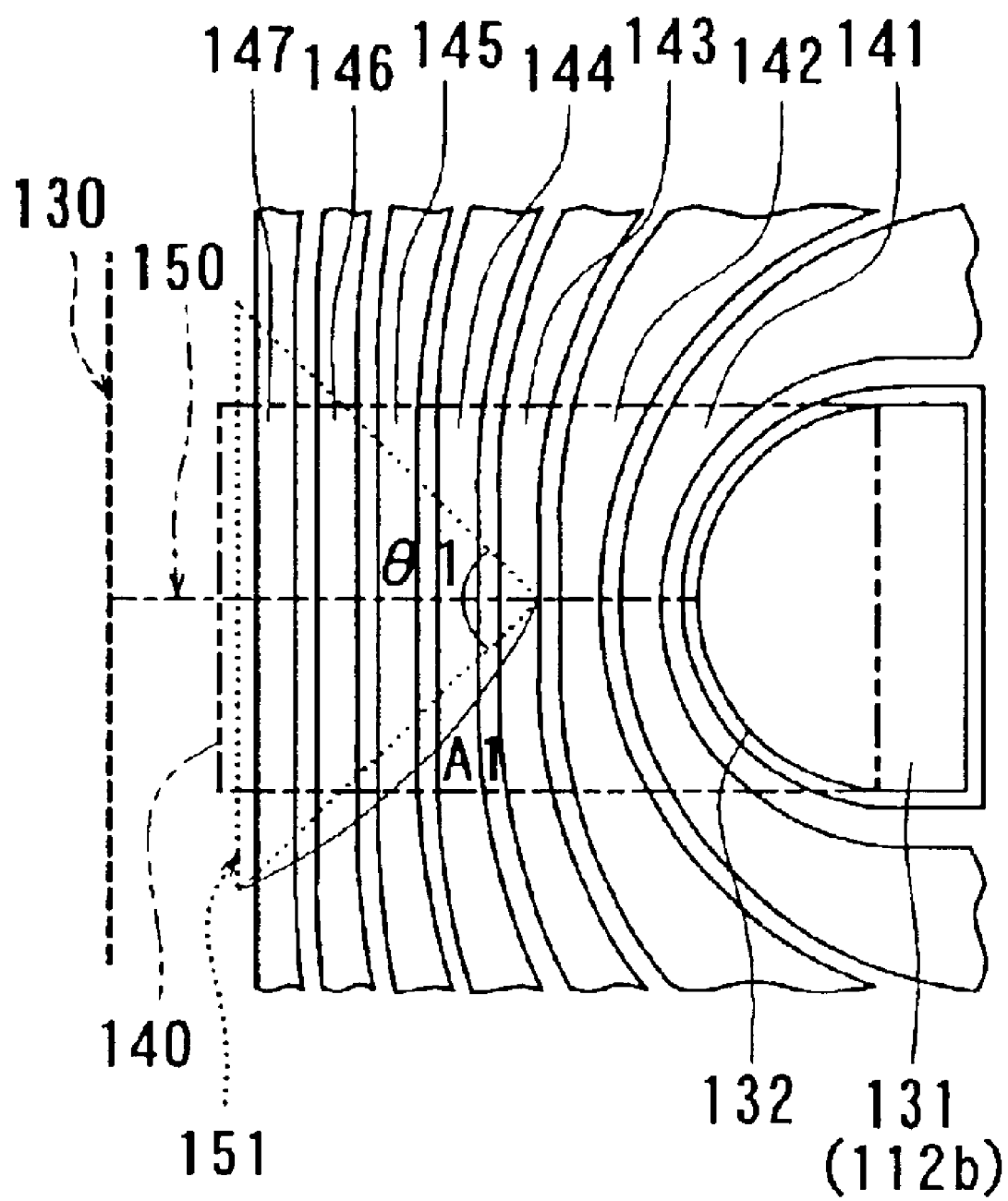
FIG. 2 is an enlarged plan view showing the part lying between the coupling portion and an air bearing surface in FIG. 1.

FIG. 2 is an enlarged plan view showing the part lying between the coupling portion 131 and the air bearing surface 130 in FIG. 1. Note that the yoke portion layer 112c of the top pole layer 112 is omitted from FIG. 2. As shown in FIG. 2, the coupling portion 131 has an end face 132 that faces toward the air bearing surface 130. This end face 132 includes a curved surface convex toward the air bearing surface 130. For example, this end face 132 is shaped like a part of a cylindrical surface.

The first to seventh turns of the thin-film coil 114 from the inner side include first to seventh portions 141–147, respectively, which are arranged between the end face 132 of the coupling portion 131 and the air bearing surface 130. In FIG. 2, the region designated by the reference numeral 140 is a region where the first to seventh portions 141–147 are located.

The inner periphery of the first portion 141 lies along the end face 132 of the coupling portion 131. The first to seventh portions 141–147 have a minimum width of the thin-film coil 114 at the position on a virtual line 150 that connects the end face 132 of the coupling portion 131 and the air bearing surface 130 in the shortest distance. Of the first to seventh portions 141–147, at least the first portion 141 includes variable width portions which increase in width with distance from the virtual line 150. The minimum width of the thin-film coil 114 is 0.5 μm. for example.

Among the first to seventh turns of the thin-film coil 114 from the inner side, each of those other than the first turn may have a portion of constant width (hereinafter, referred to as a constant width portion) located in a predetermined region covering the position on the virtual line 150. Alternatively, each of those other than the first to $n^{th}$ (n is an integer between or equal to 2 and 6) turns of the thin-film coil 114 from the inner side may have a constant width portion. FIG. 2 shows the case where the third through seventh turns each have constant width portions.

The width of the constant width portion is at the minimum in the thin-film coil 114. For example, the constant width portion has a width of 0.5 μm. The outer the turns are, the longer the constant width portions may be. Variable width portions are connected to both ends of the constant width portions.

In each turn of the thin-film coil 114, the portion other than the constant width portion and the variable width portions (hereinafter, referred to as remaining portion) has a width greater than or equal to the maximum width of the variable width portions. The remaining portion may be constant in width. For example, the remaining portion ranges from 2 to 5 μm in width. The interval between adjoining turns is 0.3 μm, for example.

In FIG. 2, the region designated by the reference numeral 151 is a region where the constant width portions of the respective turns of the thin-film coil 114 are located. This region has the shape of an isosceles triangle. Between the base and the apex, it is the base that is located closer to the air bearing surface 130. Assume here that θ1 is the angle of the apex of the isosceles triangle, and A1 is the length of the two equal sides. For smaller resistance of the thin-film coil 114, the angle θ1 and the length A1 both are preferably smaller.

The shape of the part of the thin-film coil 114 located near the end face 132 of the coupling portion 131 will be described in more detail later.

Figure 53:
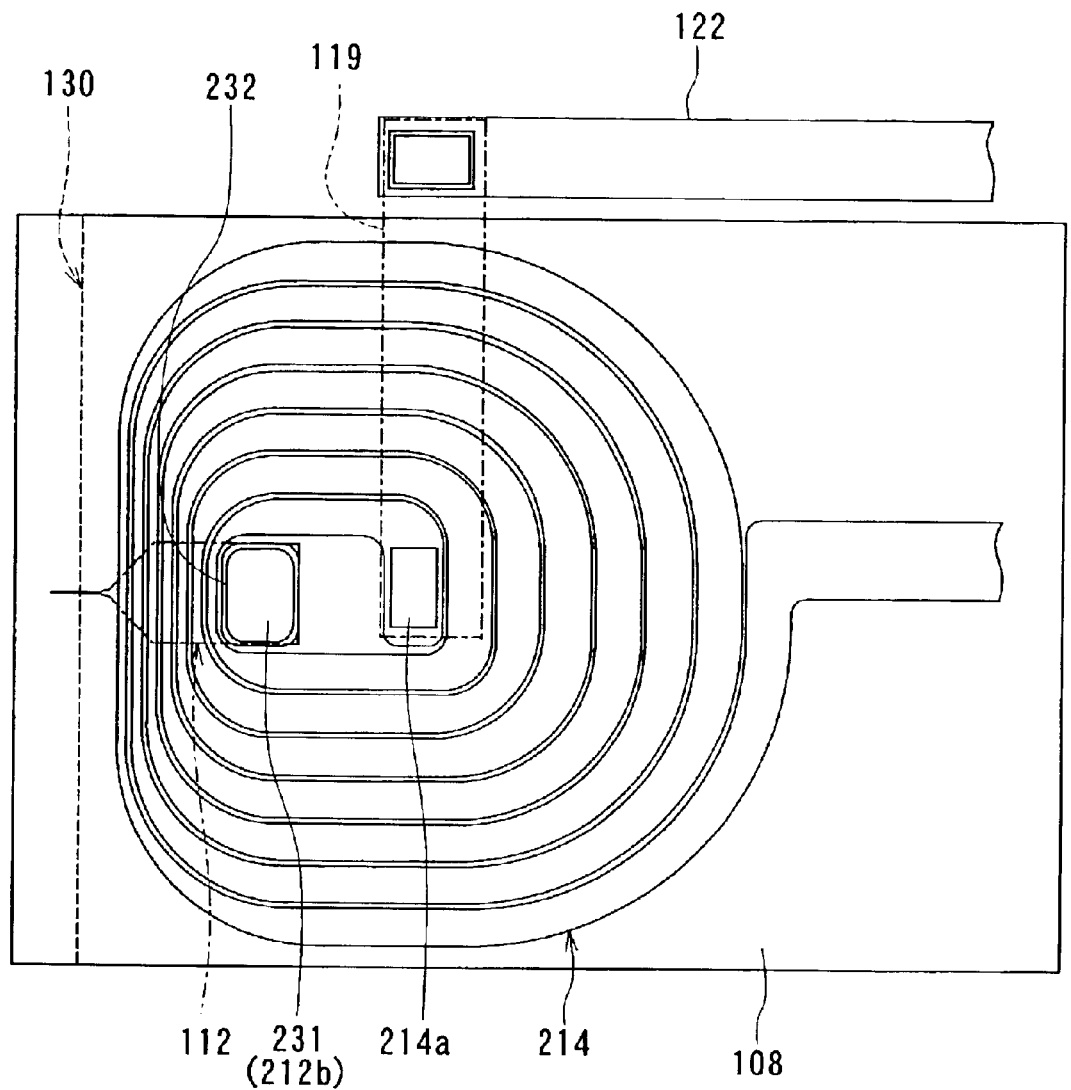
FIG. 53 is a plan view showing the shape and arrangement of a coupling portion and a thin-film coil in a thin-film magnetic head of a comparative example.
Figure 54:
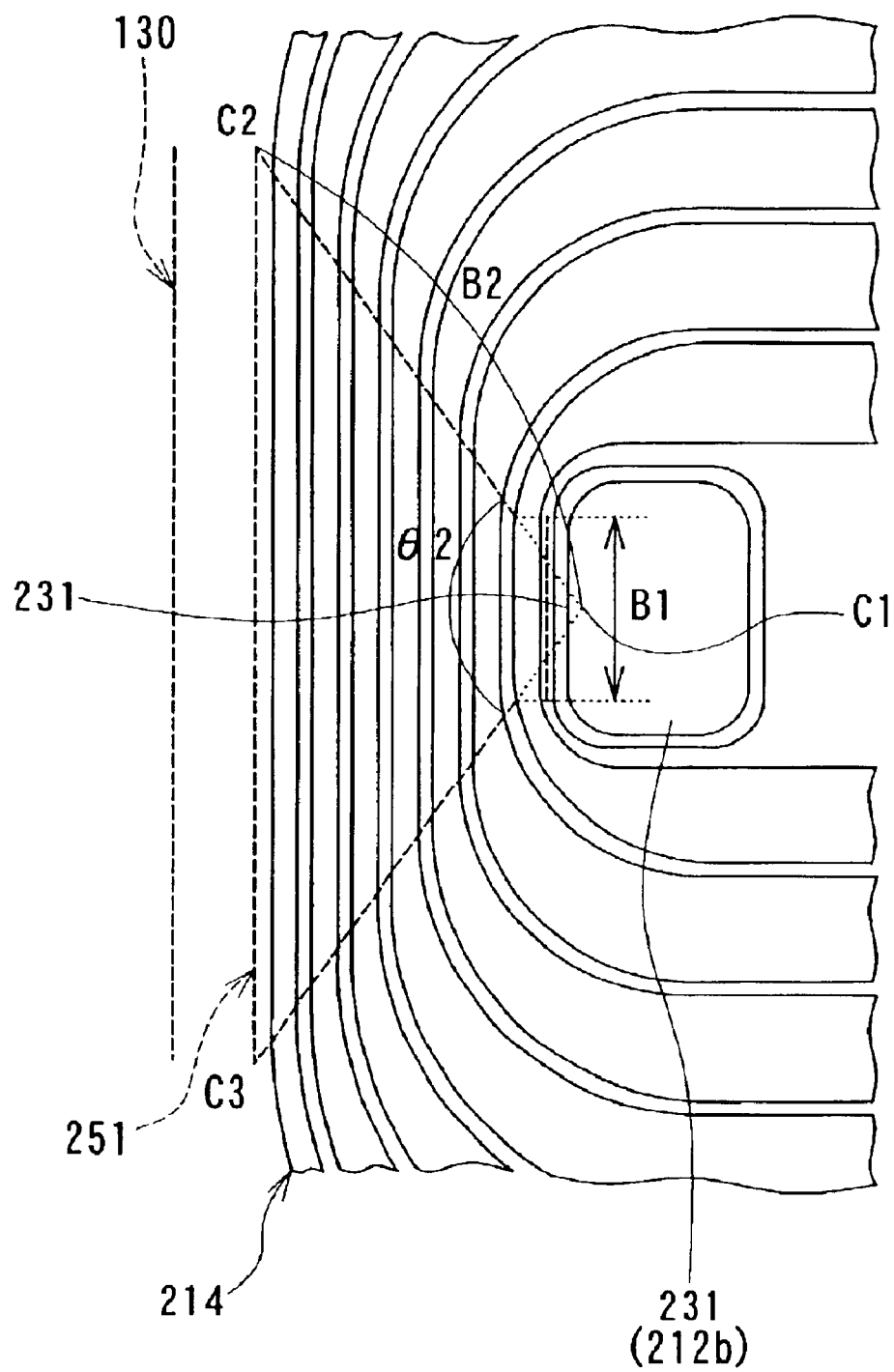
FIG. 54 is an enlarged plan view showing the part lying between the coupling portion and an air bearing surface in FIG. 53.

Now, with reference to FIGS. 53 and 54, description will be given of a thin-film magnetic head of a comparative example. FIG. 53 is a plan view showing a shape and arrangement of a coupling portion and a thin-film coil of the thin-film magnetic head of the comparative example. FIG. 54 is an enlarged plan view showing the part lying between the coupling portion and the air bearing surface in FIG. 53.

In this comparative example, the thin-film magnetic head has a coupling layer 212b, a coupling portion 231, and a thin-film coil 214 instead of the coupling layer 112b, the coupling portion 131, and the thin-film coil 114 of the thin-film magnetic head according to the present embodiment, respectively. In FIG. 53, the reference numeral 214a represents a connecting portion of the thin-film coil 214 which is connected to the lead layer 122 via the connecting layer 119. The configuration of the thin-film magnetic head of the comparative example is otherwise the same as that of the thin-film magnetic head according to the present embodiment.

The coupling portion 231 has an end face 232 that faces toward the air bearing surface 130. The end face 232 makes a flat surface parallel to the air bearing surface 130. The first to seventh turns of the thin-film coil 214 from the inner side include respective constant width portions located between the end face 232 of the coupling portion 231 and the air bearing surface 130, and in the neighborhood thereof. The width of the constant width portions is at the minimum in the thin-film coil 214.

In FIG. 54, the region designated by the reference numeral 251 is a region where the constant width portions of the respective turns of the thin-film coil 214 are located. This region has the shape of a combination of a trapezoid and a rectangle. The rectangle has long sides of the same length B1 as the length of the top of the trapezoid. The trapezoid and the rectangle are combined so that the top of the trapezoid and one of the long sides of the rectangle are in contact with each other. The base of the trapezoid is longer than the top. Between the top and the base, it is the base that is located closer to the air bearing surface 130. Here, the two oblique sides of the trapezoid shall form an angle of θ2 therebetween. The extensions of the two oblique sides of the trapezoid shall intersect at a point C1, and the two oblique sides and the base shall intersect at points C2 and C3. The line segment connecting the points C1 and C2 is identical to the line segment connecting the points C1 and C3 in length. The length shall be B2. For smaller resistance of the thin-film coil 214, the angle θ2 and the lengths B1, B2 are all preferably smaller.

If comparisons are made between FIG. 2 and FIG. 54, the angle θ1 in FIG. 2 corresponds to the angle θ2 in FIG. 54, and the length A1 in FIG. 2 corresponds to the length B2 in FIG. 54. The angle θ1 is smaller than the angle θ2. The length A1 is smaller than the length B2. This shows that the thin-film magnetic head of the present embodiment can achieve a smaller resistance of the thin-film coil 114 as compared with the thin-film magnetic head of the comparative example.

Next, with reference to FIG. 12 to FIG. 15, description will be given in detail of the shape of portions of the thin-film coil 114 of the embodiment located near the end face 132 of the coupling portion 131, in particular. FIG. 12 to FIG. 15 are plan views showing the coupling portion 131 and the portions of the thin-film coil 114 located near the end face 132. FIG. 12 to FIG. 15 also show first to fourth examples of the shape of the thin-film coil 114, respectively. Note that FIG. 12 to FIG. 15 show only the first to fourth turns of the thin-film coil 114 from the inner side.

In any of the first to fourth examples, the first to fourth turns of the thin-film coil 114 from the inner side include the first to fourth portions 141–144, respectively, which are arranged between the end face 132 of the coupling portion 131 and the air bearing surface 130. In FIG. 12 to FIG. 15, the region designated by the reference numeral 160 is a region where the first to fourth portions 141–144 are located.

Figure 12:
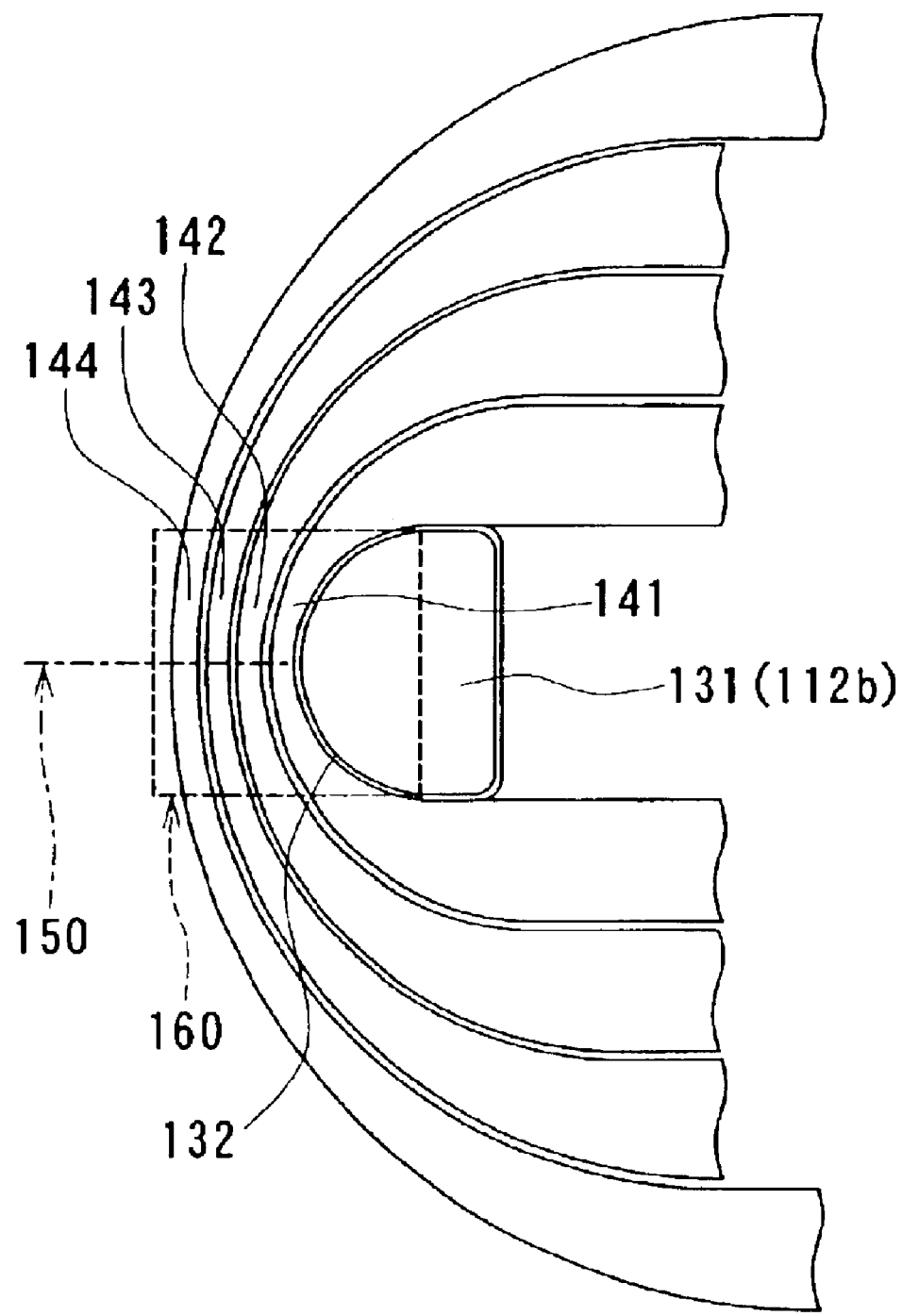
FIG. 12 is a plan view showing a first example of the shape of the thin-film coil in the first embodiment of the invention.

In the first example shown in FIG. 12, each of the first to fourth portions 141–144 becomes minimum in width at the position on a virtual line 150 that connects the end face 132 of the coupling portion 131 and the air bearing surface 130 in the shortest distance, and increases in width with distance from the virtual line 150. Although not shown, the fifth to seventh turns of the thin-film coil 114 from the inner side may include constant width portions. The outer the turns are, the longer the constant width portions may be.

In the first example, the inner periphery of the first portion 141 is shaped into an arc having a first radius of curvature. The outer periphery of the first portion 141 is shaped into an arc having a second radius of curvature which is greater than the first radius of curvature. The inner periphery of the second portion 142 is shaped into an arc having a third radius of curvature which is greater than the second radius of curvature. The outer periphery of the second portion 142 is shaped into an arc having a fourth radius of curvature which is greater than the third radius of curvature.

Similarly, the inner periphery of the third portion 143 is shaped into an arc having a fifth radius of curvature which is greater than the fourth radius of curvature. The outer periphery of the third portion 143 is shaped into an arc having a sixth radius of curvature which is greater than the fifth radius of curvature. The inner periphery of the fourth portion 144 is shaped into an arc having a seventh radius of curvature which is greater than the sixth radius of curvature. The outer periphery of the fourth portion 144 is shaped into an arc having an eighth radius of curvature which is greater than the seventh radius of curvature.

For a part of each of the first to fourth turns including the first to fourth portions 141–144, respectively, the inner and outer peripheries of the part are shaped into a semicircle, for example. In each of those turns, the center of the semicircle shaping the outer periphery of that part is located farther from the air bearing surface 130 than the center of the semicircle shaping the inner periphery is. Thus, those parts of the respective turns increase in width with distance from the virtual line 150.

Figure 13:
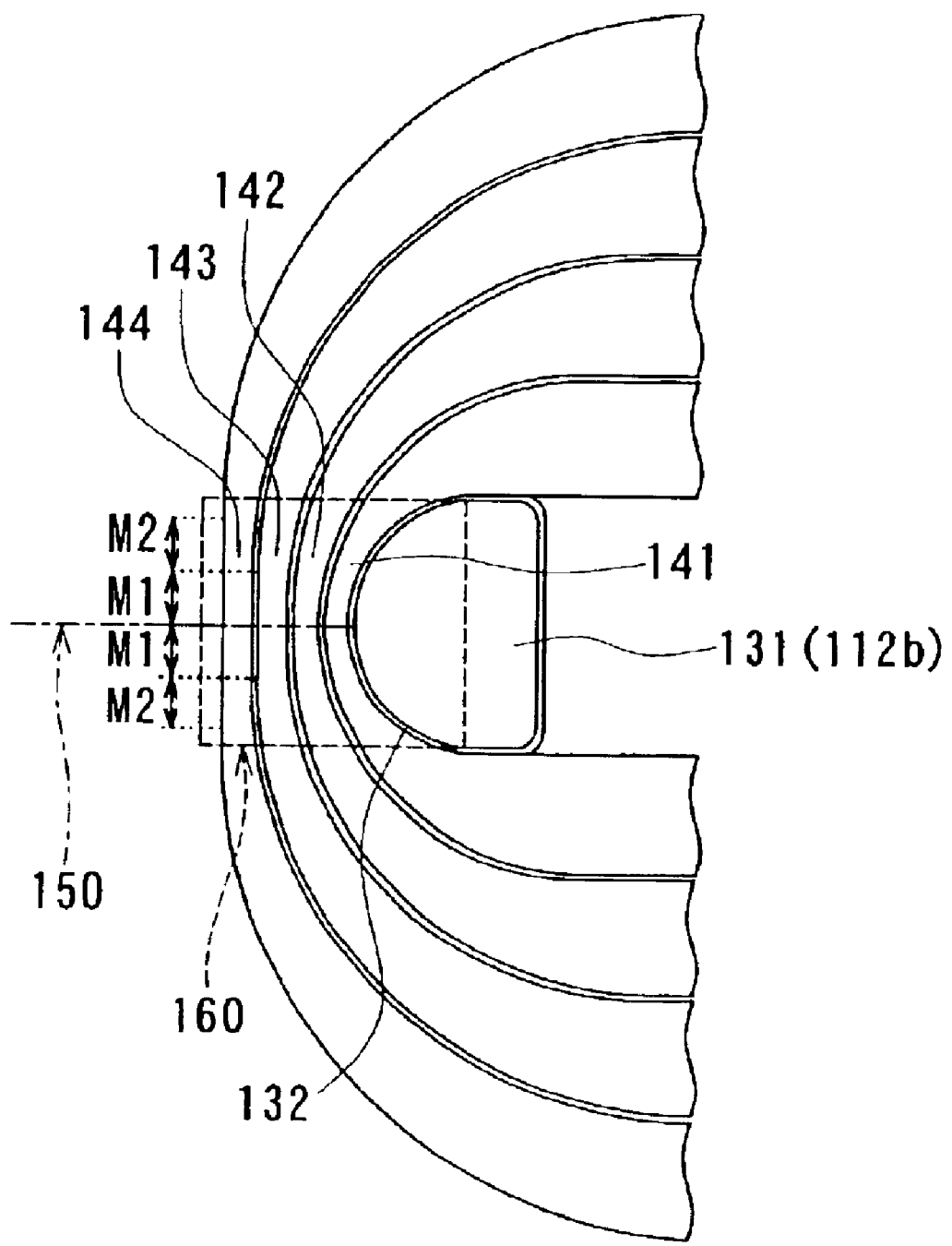
FIG. 13 is a plan view showing a second example of the shape of the thin-film coil in the first embodiment of the invention.

In the second example shown in FIG. 13, each of the first to third portions 141–143 becomes minimum in width at the position on a virtual line 150 that connects the end face 132 of the coupling portion 131 and the air bearing surface 130 in the shortest distance, and increases in width with distance from the virtual line 150. The fourth portion 144 includes a constant width portion. The ends of this constant width portion are located a length M1 away from the position on the virtual line 150 in opposite directions. The constant width portion thus has a length of 2×M1. Variable width portions are connected to the respective ends of the constant width portion. Although not shown, each of the fifth to seventh turns of the thin-film coil 114 from the inner side has a constant width portion and two variable width portions connected to respective ends of the same. The outer the turns are, the longer the constant width portions are.

In the second example, the inner periphery of the first portion 141 is shaped into an arc having a first radius of curvature. The outer periphery of the first portion 141 is shaped into an arc having a second radius of curvature which is greater than the first radius of curvature. The inner periphery of the second portion 142 is shaped into an arc having a third radius of curvature which is greater than the second radius of curvature. The outer periphery of the second portion 142 is shaped into an arc having a fourth radius of curvature which is greater than the third radius of curvature.

The inner periphery of a part of the third turn including the third portion 143 is shaped into an arc having a fifth radius of curvature which is greater than the fourth radius of curvature. The outer periphery of the part of the third turn includes a first linear portion and two arc portions connected to respective ends of the first linear portion. The first linear portion is located in a predetermined region covering the position on the virtual line 150. The arc portions have a sixth radius of curvature which is greater than the fifth radius of curvature. The ends of the first linear portion are located a length M1 away from the position on the virtual line 150 in opposite directions. The first linear portion thus has a length of 2×M1.

The inner periphery of a part of the fourth turn including the fourth portion 144 has a second linear portion and two arc portions connected to respective ends of this second linear portion. The second linear portion is located in a predetermined region covering the position on the virtual line 150. The arc portions have a seventh radius of curvature which is greater than the sixth radius of curvature. The length of the second linear portion is greater than or equal to that of the first linear portion. FIG. 13 shows the case where the first linear portion and the second linear portion both have a length of 2×M1. The outer periphery of the part of the fourth turn includes a third linear portion and two arc portions connected to respective ends of this third linear portion. The third linear portion is located in a predetermined region covering the position on the virtual line 150. The arc portions have an eighth radius of curvature which is greater than the seventh radius of curvature. The third linear portion is greater than the second linear portion in length. The ends of the third linear portion are located a length M1+M2 away from the position on the virtual line 150 in opposite directions. The third linear portion thus has a length of 2×(M1+M2). The lengths M1 and M2 may be equal or different.

In the second example, the inner and outer peripheries of part of the first turn including the first portion 141, the inner and outer peripheries of part of the second turn including the second portion 142, and the inner and outer peripheries of part of the third turn including the third portion 143 are all shaped into a semicircle, for example. In each of the first and second turns, the center of the semicircle shaping the outer periphery of that part is located farther from the air bearing surface 130 than the center of the semicircle shaping the inner periphery is. Thus, those parts of the first and second turns increase in width with distance from the virtual line 150.

As described above, in the second example, the outer periphery of part of the third turn and the inner and outer peripheries of part of the fourth turn include two arc portions each. Any of these arc portions is an arc having a central angle of 90°, for example. In the part of the third turn, the centers of the arcs shaping the outer arc portions are located farther from the air bearing surface 130 than the center of the semicircle shaping the inner periphery is. In the part of the fourth turn, the centers of the arcs shaping the outer arc portions are located farther from the air bearing surface 130 than the centers of the arcs shaping the inner arc portions are. Thus, the parts of the third and fourth turns increase in width with distance from the virtual line 150.

Here, comparisons will be made between the cases where the outer periphery of part of the third turn has the first linear portion and the two arc portions as described above and where the outer periphery of the part of the third turn has the shape of a semicircle. The radius of curvature of the arc portions in the former case can be made smaller than the radius of the semicircle in the latter case. As a result, in the former case, the arc portions can protrude more toward the air bearing surface 130 than the outer periphery in the latter case does. Thus, in the former case, the width of the variable width portion can be increased with distance from the virtual line 150 more drastically than in the latter case. This allows a reduction in the resistance of the part of the third turn. The foregoing also holds true for a part of the fourth turn. Specifically, in the part of the fourth turn, the third linear portion of the outer periphery can be made longer than the second linear portion of the inner periphery to obtain the foregoing effect.

Figure 14:
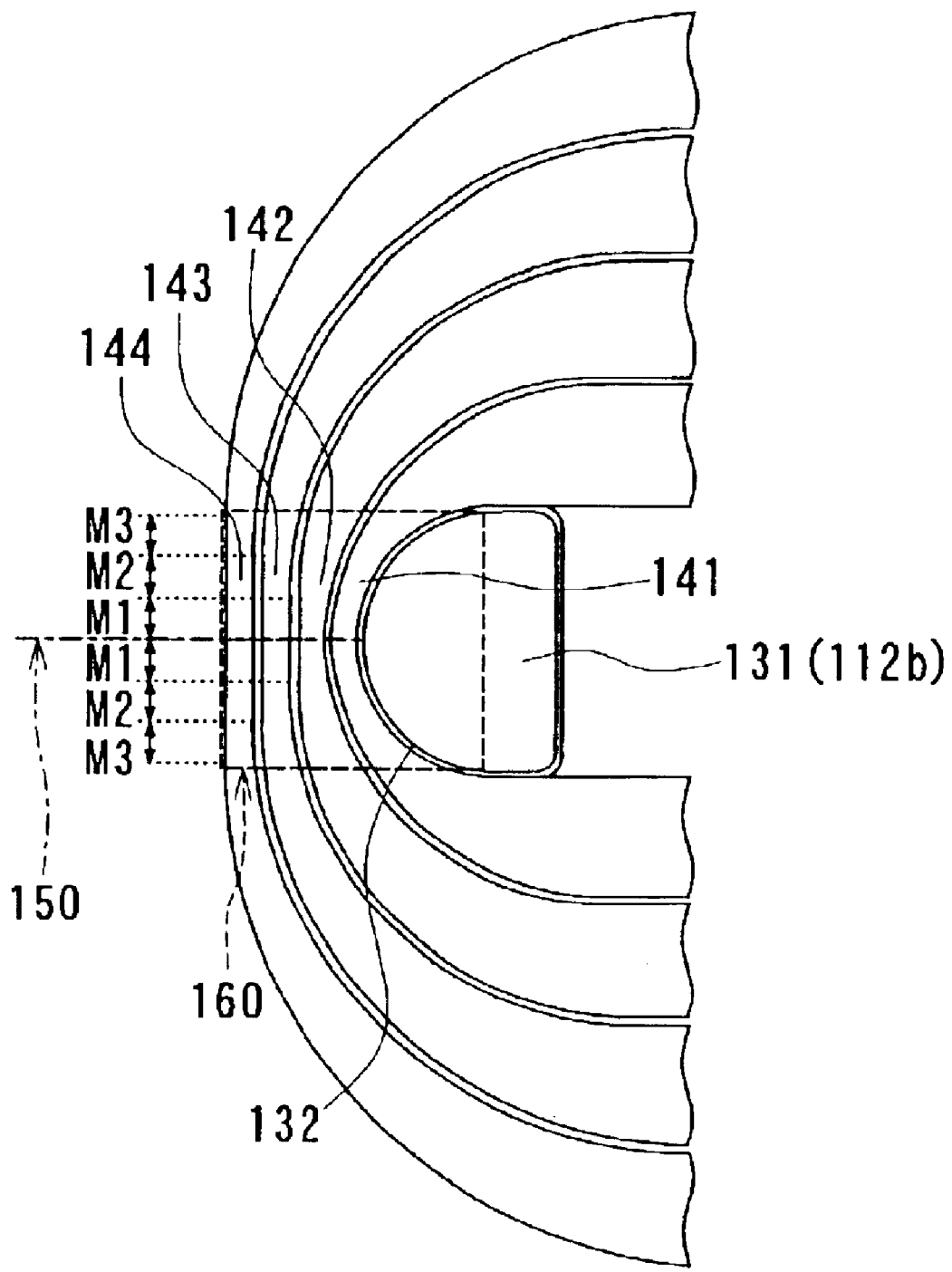
FIG. 14 is a plan view showing a third example of the shape of the thin-film coil in the first embodiment of the invention.

In the third example shown in FIG. 14, each of the first and second portions 141, 142 becomes minimum in width at the position on the virtual line 150 that connects the end face 132 of the coupling portion 131 and the air bearing surface 130 in the shortest distance, and increases in width with distance from the virtual line 150. Each of the third and fourth portions 143, 144 includes a constant width portion. The ends of the constant width portion of the third portion 143 are located a length M1 away from the position on the virtual line 150 in opposite directions. Thus, the constant width portion of the third portion 143 has a length of 2×M1. Variable width portions are connected to the respective ends of the constant width portion of the third portion 143. The ends of the constant width portion of the fourth portion 144 are located a length M1+M2 away from the position on the virtual line 150 in opposite directions. Thus, the constant width portion of the fourth portion 144 has a length of 2×(M1+M2). Variable width portions are connected to the respective ends of the constant width portion of the fourth portion 144. Although not shown, each of the fifth to seventh turns of the thin-film coil 114 from the inner side has a constant width portion and two variable width portions connected to respective ends of the same. The outer the turns are, the longer the constant width portions are.

In the third example, the inner periphery of the first portion 141 is shaped into an arc having a first radius of curvature. The outer periphery of the first portion 141 is shaped into an arc having a second radius of curvature which is greater than the first radius of curvature. The inner periphery of the second portion 142 is shaped into an arc having a third radius of curvature which is greater than the second radius of curvature. The outer periphery of the second portion 142 includes a first linear portion and two arc portions connected to respective ends of this first linear portion. The first linear portion is located in a predetermined region covering the position on the virtual line 150. The arc portions have a fourth radius of curvature which is greater than the third radius of curvature. The ends of the first linear portion are located a length M1 away from the position on the virtual line 150 in opposite directions. The first linear portion thus has a length of 2×M1.

In the third example, the inner periphery of a part of the third turn including the third portion 143 has a second linear portion and two arc portions connected to respective ends of the second linear portion. The second linear portion is located in a predetermined region covering the position on the virtual line 150. The arc portions have a fifth radius of curvature which is greater than the fourth radius of curvature. The length of the second linear portion is greater than or equal to that of the first linear portion. FIG. 14 shows the case where the first linear portion and the second linear portion both have a length of 2×M1. The outer periphery of the part of the third turn includes a third linear portion and two arc portions connected to respective ends of this third linear portion. The third linear portion is located in a predetermined region covering the position on the virtual line 150. The arc portions have a sixth radius of curvature which is greater than the fifth radius of curvature. The third linear portion is greater than the second linear portion in length. The ends of the third linear portion are located a length M1+M2 away from the position on the virtual line 150 in opposite directions. The third linear portion thus has a length of 2×(M1+M2).

Moreover, in the third example, the inner periphery of a part of the fourth turn including the fourth portion 144 has a fourth linear portion and two arc portions connected to respective ends of the fourth linear portion. The fourth linear portion is located in a predetermined region covering the position on the virtual line 150. The arc portions have a seventh radius of curvature which is greater than the sixth radius of curvature. The length of the fourth linear portion is greater than or equal to that of the third linear portion. FIG. 14 shows the case where the third linear portion and the fourth linear portion both have a length of 2×(M1+M2). The outer periphery of the part of the fourth turn includes a fifth linear portion and two arc portions connected to respective ends of the fifth linear portion. The fifth linear portion is located in a predetermined region covering the position on the virtual line 150. The arc portions have an eighth radius of curvature which is greater than the seventh radius of curvature. The fifth linear portion is greater than the fourth linear portion in length. The ends of the fifth linear portion are located a length M1+M2+M3 away from the position on the virtual line 150 in opposite directions. The fifth linear portion thus has a length of 2×(M1+M2+M3). The lengths M1, M2 and M3 may be equal or different.

In the third example, the inner and outer peripheries of part of the first turn including the first portion 141, and the inner periphery of part of the second turn including the second portion 142 are all shaped into a semicircle, for example. In the first turn, the center of the semicircle shaping the outer periphery of that part is located farther from the air bearing surface 130 than the center of the semicircle shaping the inner periphery is. Thus, the width of the part of the first turn increases with distance from the virtual line 150.

As described above, in the third example, the outer periphery of part of the second turn, the inner and outer peripheries of part of the third turn, and the inner and outer peripheries of part of the fourth turn include two arc portions each. Any of these arc portions is an arc having a central angle of 90°, for example. In the part of the second turn, the centers of the arcs shaping the outer arc portions are located farther from the air bearing surface 130 than the center of the semicircle shaping the inner periphery is. In the part of each of the third and fourth turns, the centers of the arcs shaping the outer arc portions are located farther from the air bearing surface 130 than the centers of the arcs shaping the inner arc portions are. Thus, the parts of the second to fourth turns increase in width with distance from the virtual line 150.

In the third example, the effect resulting from the fact that the outer periphery of the second portion 142 includes the first linear portion is the same as described in conjunction with the part of the third turn in the second example. In the third example, the effects resulting from the facts that the third linear portion is longer than the second linear portion and that the fifth linear portion is longer than the fourth linear portion are both the same as described in conjunction with the part of the fourth turn in the second example.

Figure 15:
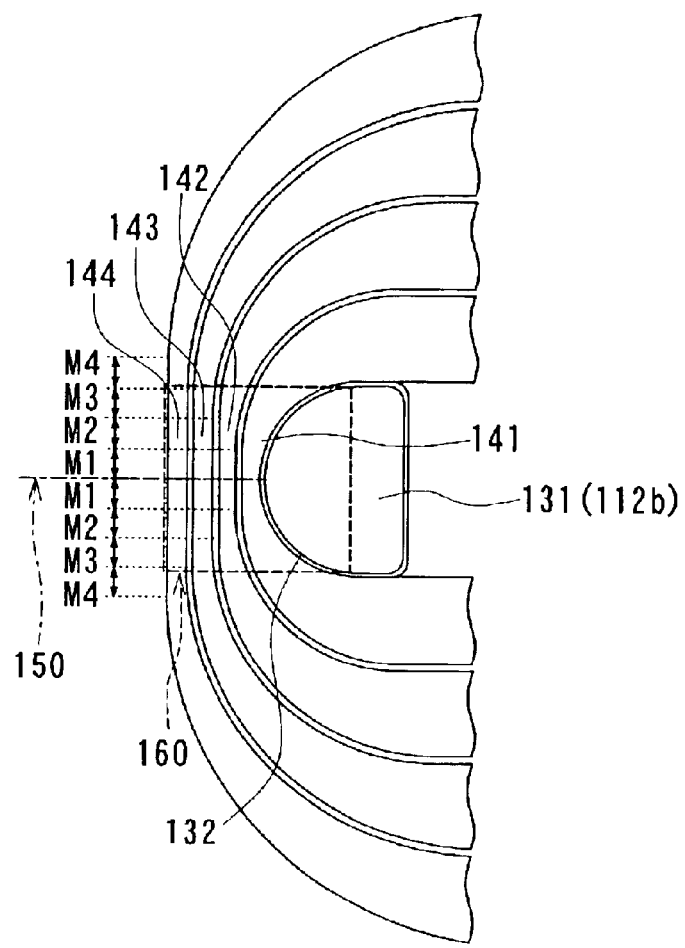
FIG. 15 is a plan view showing a fourth example of the shape of the thin-film coil in the first embodiment of the invention.

In the fourth example shown in FIG. 15, the first portion 141 becomes minimum in width at the position on the virtual line 150 that connects the end face 132 of the coupling portion 131 and the air bearing surface 130 in the shortest distance, and increases in width with distance from the virtual line 150. Each of the second to fourth portions 142–144 includes a constant width portion. The ends of the constant width portion of the second portion 142 are located a length M1 away from the position on the virtual line 150 In opposite directions. Thus, the constant width portion of the second portion 142 has a length of 2×M1. Variable width portions are connected to the respective ends of the constant width portion of the second portion 142. The ends of the constant width portion of the third portion 143 are located a length M1+M2 away from the position on the virtual line 150 in opposite directions. Thus, the constant width portion of the third portion 143 has a length of 2×(M1+M2). Variable width portions are connected to the respective ends of the constant width portion of the third portion 143. The ends of the constant width portion of the fourth portion 144 are located a length M1+M2+M3 away from the position on the virtual line 150 in opposite directions. Thus, the constant width portion of the fourth portion 144 has a length of 2×(M1+M2+M3). Variable width portions are connected to the respective ends of the constant width portion of the fourth portion 144. Although not shown, each of the fifth to seventh turns of the thin-film coil 114 from the inner side has a constant width portion and two variable width portions connected to respective ends of the same. The outer the turns are, the longer the constant width portions are.

In the fourth example, the inner periphery of the first portion 141 is shaped into an arc having a first radius of curvature. The outer periphery of the first portion 141 includes a first linear portion and two arc portions connected to respective ends of the first linear portion. The first linear portion is located In a predetermined region covering the position on the virtual line 150. The arc portions have a second radius of curvature which is greater than the first radius of curvature. The ends of the first linear portion are located a length M1 away from the position on the virtual line 150 in opposite directions. The first linear portion thus has a length of 2×M1. The inner periphery of the second portion 142 has a second linear portion and two arc portions connected to respective ends of the second linear portion. The second linear portion is located in a predetermined region covering the position on the virtual line 150. The arc portions have a third radius of curvature which is greater than the second radius of curvature. The length of the second linear portion is greater than or equal to that of the first linear portion. FIG. 15 shows the case where the first linear portion and the second linear portion both have a length of 2×M1. The outer periphery of the second portion 142 includes a third linear portion and two arc portions connected to respective ends of the third linear portion. The third linear portion is located in a predetermined region covering the position on the virtual line 150. The arc portions have a fourth radius of curvature which is greater than the third radius of curvature. The ends of the third linear portion are located a length M1+M2 away from the position on the virtual line 150 in opposite directions. The third linear portion thus has a length of 2×(M1+M2).

In the fourth example, the inner periphery of a part of the third turn including the third portion 143 has a fourth linear portion and two arc portions connected to respective ends of the fourth linear portion. The fourth linear portion is located in a predetermined region covering the position on the virtual line 150. The arc portions have a fifth radius of curvature which is greater than the fourth radius of curvature. The length of the fourth linear portion is greater than or equal to that of the third linear portion. FIG. 15 shows the case where the third linear portion and the fourth linear portion both have a length of 2×(M1+M2). The outer periphery of the part of the third turn includes a fifth linear portion and two arc portions connected to respective ends of the fifth linear portion. The fifth linear portion is located in a predetermined region covering the position on the virtual line 150. The arc portions have a sixth radius of curvature which is greater than the fifth radius of curvature. The fifth linear portion is greater than the fourth linear portion in length. The ends of the fifth linear portion are located a length M1+M2+M3 away from the position on the virtual line 150 in opposite directions. The fifth linear portion thus has a length of 2×(M1+M2+M3).

Moreover, in the fourth example, the inner periphery of a part of the fourth turn including the fourth portion 144 has a sixth linear portion and two arc portions connected to respective ends of the sixth linear portion. The sixth linear portion is located in a predetermined region covering the position on the virtual line 150. The arc portions have a seventh radius of curvature which is greater than the sixth radius of curvature. The length of the sixth linear portion is greater than or equal to that of the fifth linear portion. FIG. 15 shows the case where the fifth linear portion and the sixth linear portion both have a length of 2×(M1+M2+M3). The outer periphery of the part of the fourth turn includes a seventh linear portion and two arc portions connected to respective ends of the seventh linear portion. The seventh linear portion is located in a predetermined region covering the position on the virtual line 150. The arc portions have an eighth radius of curvature which is greater than the seventh radius of curvature. The seventh linear portion is greater than the sixth linear portion in length. The ends of the seventh linear portion are located a length M1+M2+M3+M4 away from the position on the virtual line 150 in opposite directions. The seventh linear portion thus has a length of 2×(M1+M2+M3+M4). The lengths M1, M2, M3 and M4 may be equal or different.

In the fourth example, the inner periphery of part of the first turn including the first portion 141 is shaped into a semicircle, for example. As described above, in the fourth example, the outer periphery of the part of the first turn, the inner and outer peripheries of part of the second turn, the inner and outer peripheries of part of the third turn, and the inner and outer peripheries of part of the fourth turn include two arc portions each. Any of these arc portions is an arc having a central angle of 90°, for example. In the part of the first turn, the centers of the arcs shaping the outer arc portions are located farther from the air bearing surface 130 than the center of the semicircle shaping the inner periphery is. In the part of each of the second to fourth turns, the centers of the arcs shaping the outer arc portions are located farther from the air bearing surface 130 than the centers of the arcs shaping the inner arc portions are. Thus, the parts of the first to fourth turns increase in width with distance from the virtual line 150.

In the fourth example, the effect resulting from the fact that the outer periphery of the first portion 141 includes the first linear portion is the same as described in conjunction with the part of the third turn in the second example. In the fourth example, the effects resulting from the facts that the third linear portion is longer than the second linear portion, that the fifth linear portion is longer than the fourth linear portion, and that the seventh linear portion is longer than the sixth linear portion are all the same as described in conjunction with the part of the fourth turn in the second example.

Next, with reference to FIG. 16 to FIG. 22, the shape of the top surface of the coupling portion 131 will be described in conjunction with seven examples. FIG. 16 to FIG. 22 are plan views of the coupling portion 131. Note that any section of the coupling portion 131 taken in parallel with the top surface has the same shape as that of the top surface.

Figure 16:
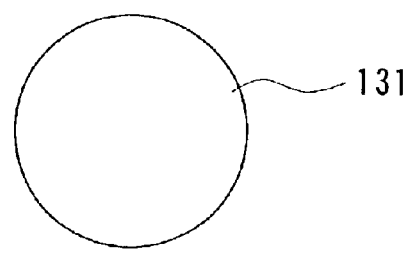
FIG. 16 is a plan view showing a first example of the shape of the top surface of the coupling portion in the first embodiment of the invention.

In the first example shown in FIG. 16, the top surface of the coupling portion 131 is circular in shape. In the second example shown in FIG. 17, the top surface of the coupling portion 131 has the shape of a semicircle. In this example, the arc of the semicircle faces toward the air bearing surface 130.

Figure 18:
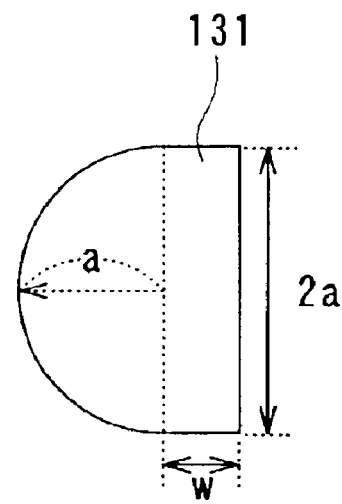
FIG. 18 is a plan view showing a third example of the shape of the top surface of the coupling portion in the first embodiment of the invention.

In the third example shown in FIG. 18, the top surface of the coupling portion 131 has the shape of a combination of a semicircle and a rectangle. The semicircle has a radius of a. The rectangle has long sides of 2a in length and short sides of W in length. The chord of the semicircle and one of the long sides of the rectangle are in contact with each other. In this example, the arc of the semicircle faces toward the air bearing surface 130.

Figure 19:
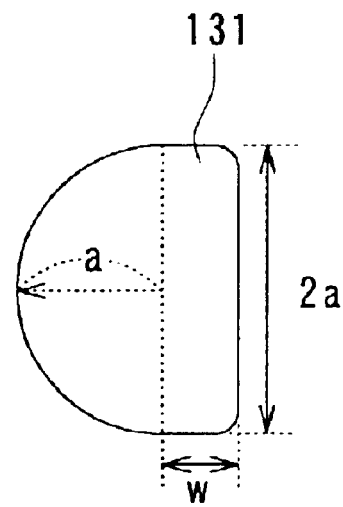
FIG. 19 is a plan view showing a fourth example of the shape of the top surface of the coupling portion in the first embodiment of the invention.

In the fourth example shown in FIG. 19, the top surface of the coupling portion 131 has the shape shown in FIG. 18 with the two corners rounded.

Figure 20:
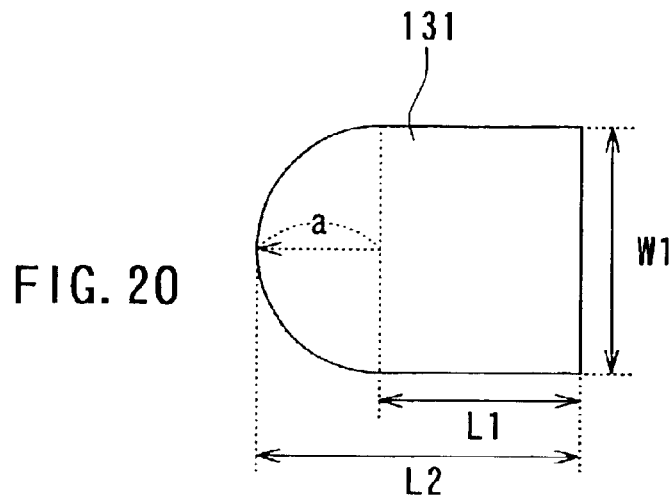
FIG. 20 is a plan view showing a fifth example of the shape of the top surface of the coupling portion in the first embodiment of the invention.

In the fifth example shown in FIG. 20, the top surface of the coupling portion 131 has the shape of a combination of a semicircle and a rectangle. The semicircle has a radius of a. The rectangle has two parallel sides of 2a in length and the other two parallel sides of L1 in length. The chord of the semicircle and one of the length-2a sides of the rectangle are in contact with each other. In this example, the arc of the semicircle faces toward the air bearing surface 130. In this example, the length L2 of the coupling portion 131 in a direction perpendicular to the air bearing surface 130 (the horizontal length of the coupling portion 131 in FIG. 20) is greater than the width W1 (=2a) of the coupling portion 131 (the vertical length of the coupling portion 131 in FIG. 20). The length L1 and the length 2a may be equal.

Figure 21:
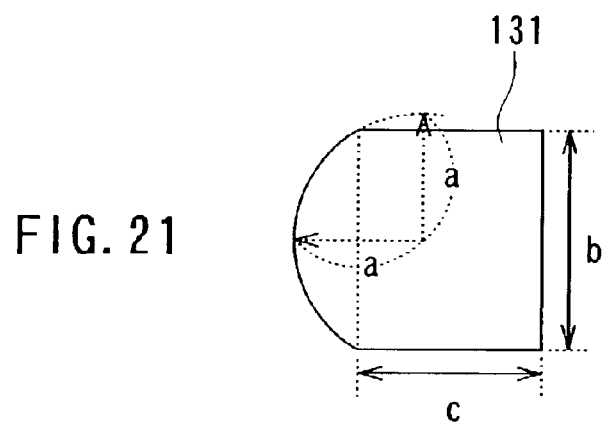
FIG. 21 is a plan view showing a sixth example of the shape of the top surface of the coupling portion in the first embodiment of the invention.

In the sixth example shown in FIG. 21, the top surface of the coupling portion 131 has the shape of a combination of a segment and a rectangle. The segment has a chord of b in length. The rectangle has two parallel sides of b in length and the other two parallel sides of c in length. The chord of the segment and one of the length-b sides of the rectangle are in contact with each other. The arc of the segment is a part of a circle having a radius of a, with a central angle of less than 180°. In this example, the arc of the segment faces toward the air bearing surface 130.

Figure 22:
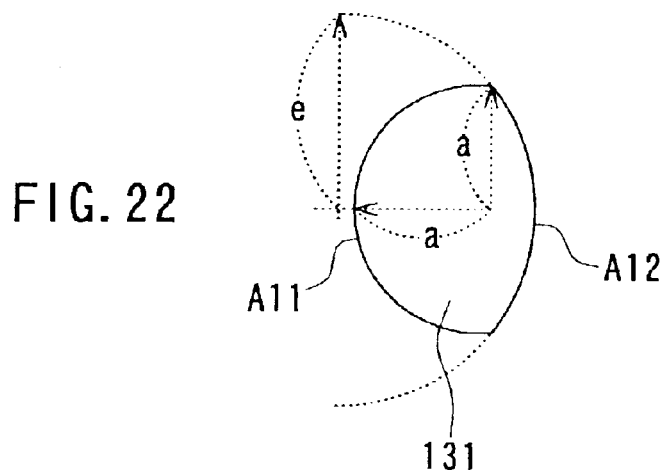
FIG. 22 is a plan view showing a seventh example of the shape of the top surface of the coupling portion in the first embodiment of the invention.

In the seventh example shown in FIG. 22, the top surface of the coupling portion 131 is shaped as if enclosed by arcs A11 and A12. The arc A11 has a radius of a and a central angle of 180°. The arc A12 has a radius of e. The radius e of the arc A12 is greater than the radius a of the arc A11. The central angle of the arc A12 is smaller than 180°. The arc A11 and the arc A12 are placed convex in opposite directions. In this example, the arc A11 faces toward the air bearing surface 130.

As described above, in the thin-film magnetic head according to the present embodiment, the coupling portion 131 has the end face 132 that faces toward the air bearing surface 130. The end face 132 includes a curved surface convex toward the air bearing surface 130. The first to seventh turns of the thin-film coil 114 from the inner side include the first to seventh portions 141–147, respectively, which are arranged between the end face 132 of the coupling portion 131 and the air bearing surface 130. The first to seventh portions 141–147 have a minimum width of the thin-film coil 114 at the position on the virtual line 150 that connects the end face 132 of the coupling portion 131 and the air bearing surface 130 in the shortest distance. Of the first to seventh portions 141–147, at least the first portion 141 includes variable width portions which increase in width with distance from the virtual line 150. Consequently, in the thin-film magnetic head according to the present embodiment, the portion having the minimum width of the thin-film coil 114 can be reduced in length as compared with the thin-film magnetic head of the comparative example shown in FIGS. 53 and 54. Consequently, according to the present embodiment, it is possible to reduce the yoke length, or the magnetic path length, while reducing the resistance of the thin-film coil 114. According to the present embodiment, it is therefore possible to achieve a thin-film magnetic head which is small in magnetic path length and thus excellent in recording characteristics at high frequency bands, and has the thin-film coil 114 of small resistance.

In the comparative example described above, as can be seen from FIG. 54, an increase in the number of turns of the thin-film coil 214 causes a widening of the region 251 where the constant width portions of the respective turns of the thin-film coil 214 are located, and its widening rate is high. On the contrary, in the present embodiment, as can be seen from FIG. 2, an increase in the number of turns of the thin-film coil 114 does cause a widening of the region 151 where the constant width portions of the respective turns of the thin-film coil 114 are located, but the widening rate is lower than that in the comparative example. According to the present embodiment, it is therefore possible to suppress an increase in the resistance of the thin-film coil 114 due to an/increase in the number of turns of the thin-film coil 114. Consequently, according to the present embodiment, the recording characteristics of the thin-film magnetic head can be easily improved by increasing the number of turns of the thin-film coil 114.

According to the present embodiment, the resistance of the thin-film coil 114 can be made smaller than in the comparative example. Consequently, according to the present embodiment, it is possible to prevent the magnetic pole portions from protruding toward the recording medium due to the heat caused by the thin-film coil 114.

According to the present embodiment, the area where to dispose the thin-film coil 114 can be made smaller than in the comparative example. Thus, the present embodiment allows miniaturization of the thin-film magnetic head.

Figure 17:
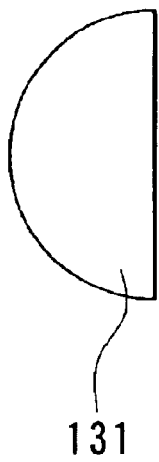
FIG. 17 is a plan view showing a second example of the shape of the top surface of the coupling portion in the first embodiment of the invention.

The top surface of the coupling portion 131 shown in each of FIG. 18 to FIG. 22 has the shape of a semicircle or segment, with another figure such as a rectangle connected to the chord thereof. When the top surface of the coupling portion 131 has such a shape, the width of the coupling portion 131 (the vertical length of the coupling portion 131 in FIG. 17 to FIG. 22) can be made smaller without reducing the area of the top surface of the coupling portion 131, as compared with the case where the coupling portion 131 has a semicircular top surface as shown in FIG. 17. Consequently, the portion having the minimum width of the thin-film coil 114 can be further reduced in length to make the resistance of the thin-film coil 114 even smaller.

As for the coupling portion 131 shown in FIG. 20, the length L2 of the coupling portion 131 in a direction perpendicular to the air bearing surface 130 is greater than the width W1 of the coupling portion 131. This allows the width W1 of the coupling portion 131 to be smaller without reducing the area of the top surface of the coupling portion 131, as compared with the case where the length L2 is smaller than or equal to the width W1. Consequently, the portion having the minimum width of the thin-film coil 114 can be further reduced in length to make the resistance of the thin-film coil 114 even smaller.

[Second Embodiment]

Figure 23:
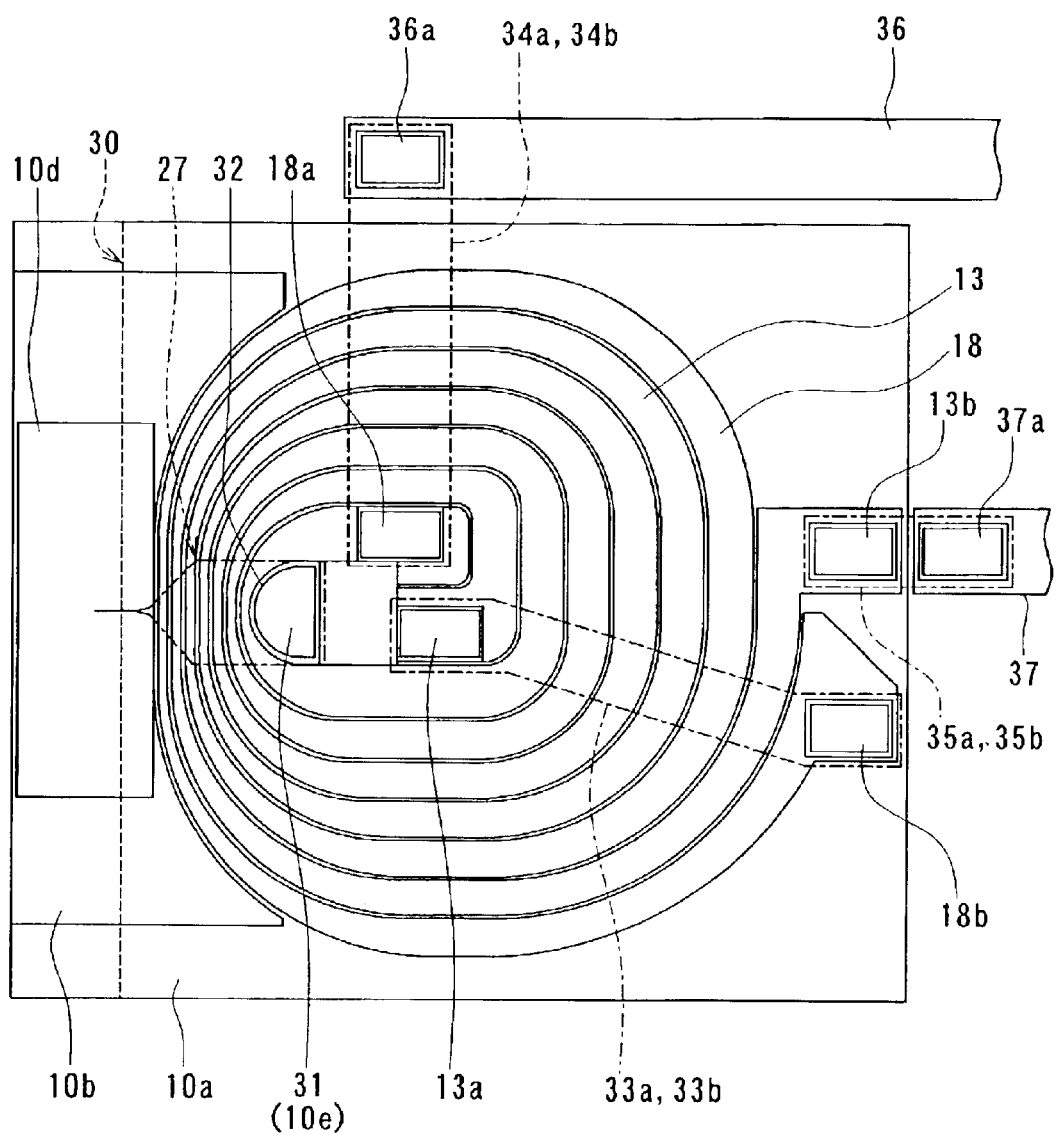
FIG. 23 is a plan view showing the shape and arrangement of a coupling portion and a thin-film coil in a second embodiment of the invention.
Figure 39:
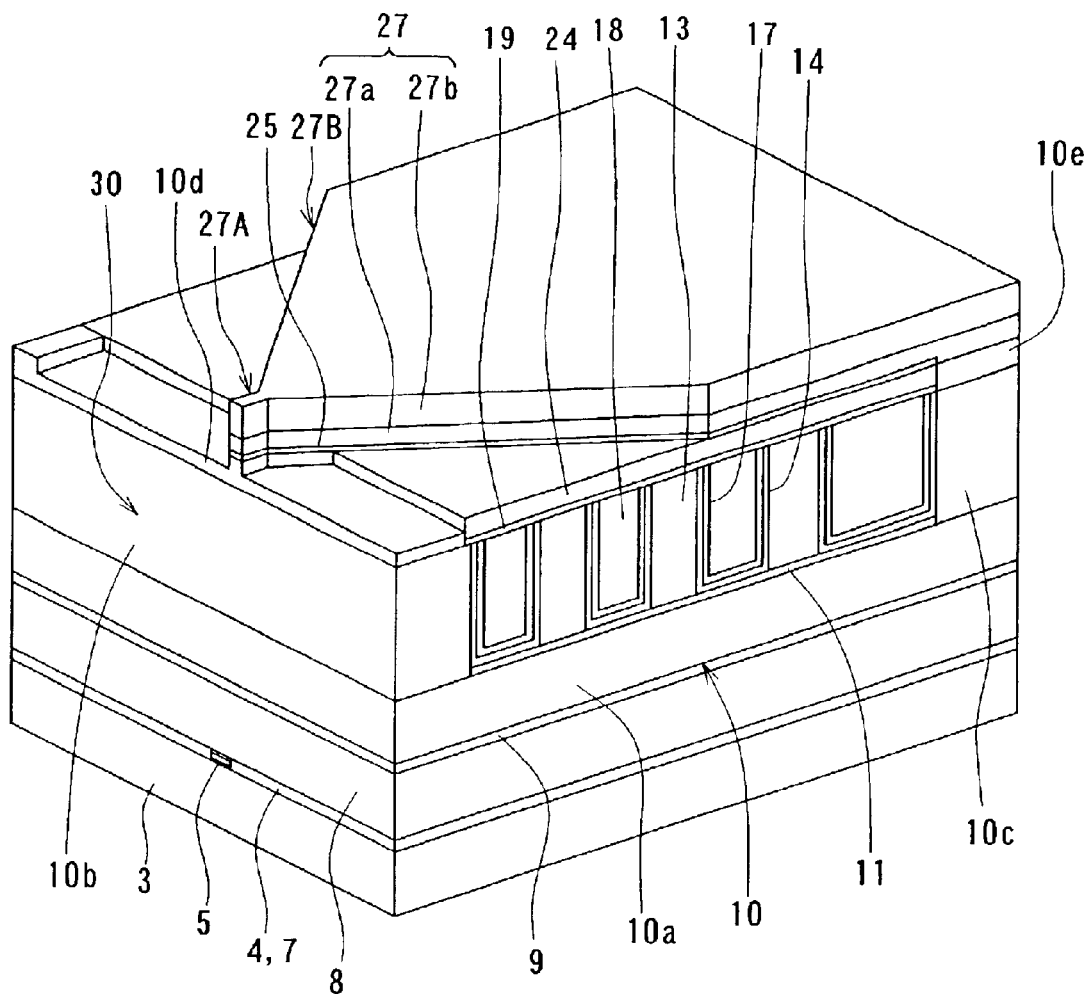
FIG. 39 is a perspective view showing an example of the configuration of the thin-film magnetic head In the second embodiment of the invention.
Figure 40:
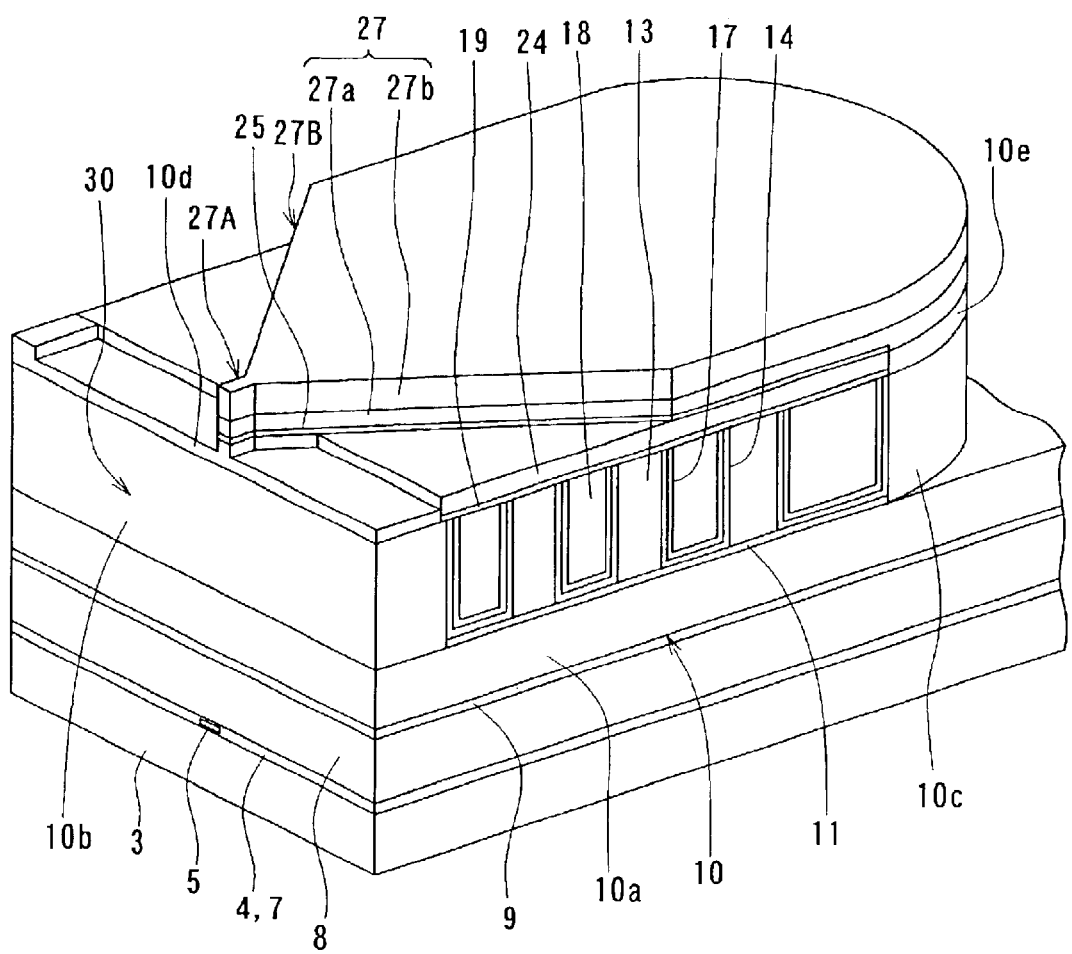
FIG. 40 is a perspective view showing another example of the configuration of the thin-film magnetic head in the second embodiment of the invention.

Now, a thin-film magnetic head and a method of manufacturing the same according to a second embodiment of the invention will be described with reference to FIG. 23, FIG. 24A to FIG. 38A, FIG. 24B to FIG. 38B, FIG. 39, and FIG. 40. FIG. 23 is a plan view showing the shape and arrangement of a coupling portion and a thin-film coil according to the present embodiment. Note that FIG. 23 shows the state before the air bearing surface is formed by lapping. FIG. 24A to FIG. 38A are cross sections each orthogonal to the air bearing surface and the top surface of the substrate. FIG. 24B to FIG. 38B are cross sections of the magnetic pole portions each parallel to the air bearing surface. FIGS. 39 and 40 are perspective views showing two examples of the configuration of the thin-film magnetic head according to the present embodiment excluding the overcoat layer.

In the method of manufacturing the thin-film magnetic head of the present embodiment, as shown in FIGS. 24A and 24B, an insulating layer 2 made of alumina ($Al_2O_3$), for example, is first deposited to a thickness of approximately 2 to 5 µm on a substrate 1 made of aluminum oxide and titanium carbide ($Al_2O_3$—TiC), for example. Next, a bottom shield layer 3 intended for a reproducing head, made of a magnetic material such as Permalloy, is formed to a thickness of approximately 2 to 3 µm on the insulating layer 2. The bottom shield layer 3 is selectively formed on the insulating layer 2 by plating using a photoresist film as a mask, for example. Then, although not shown, an insulating layer made of alumina, for example, is formed all over to a thickness of 3 to 4 µm, for example. The insulating layer is then polished by, for example, CMP to expose the bottom shield layer 3, and its surface is flattened.

On the bottom shield layer 3, a bottom shield gap film 4 serving as an insulating film is formed to a thickness of approximately 20 to 40 nm, for example. On the bottom shield gap film 4, an MR element 5 for magnetic signal detection is formed to a thickness of tens of nanometers. For example, the MR element 5 may be formed by selectively etching an MR film formed by sputtering. The MR element 5 is located near a region where to form an air bearing surface to be described later. The MR element 5 may be an element utilizing a magnetosensitive film that exhibits magnetoresistivity, such as an AMR element, a GMR element or a TMR element. Next, although not shown, a pair of electrode layers to be electrically connected to the MR element 5 are formed to a thickness of tens of nanometers on the bottom shield gap film 4. Then, a top shield gap film 7 serving as an insulating film is formed to a thickness of approximately 20 to 40 nm, for example, on the bottom shield gap film 4 and the MR element 5. The MR element 5 is embedded in the shield gap films 4 and 7. Examples of insulating materials to be used for the shield gap films 4 and 7 include alumina, aluminum nitride, and diamond-like carbon (DLC). The shield gap films 4 and 7 may be formed by sputtering or CVD.

Next, a top shield layer 8 intended for the reproducing head, made of a magnetic material, is selectively formed on the top shield gap film 7 to a thickness of approximately 1.0 to 1.5 µm. Then, an insulating layer 9 made of alumina, for example, is formed to a thickness of approximately 0.15 to 0.2 µm over the entire top surface of the laminate obtained through the foregoing steps. On the insulating layer 9, a first layer 10a of a bottom pole layer 10 is formed to a thickness of 0.5 to 1.0 µm, for example. The bottom pole layer 10 includes the first layer 10a, and second to fifth layers 10b, 10c, 10d, and 10e to be described later.

The first layer 10a is formed by sputtering, using a high saturation flux density material such as FeAlN, FeN, FeCo, CoFeN, and FeZrN. The first layer 10a may also be formed by plating, using NiFe (Ni: 80 weight %; Fe: 20 weight %), or NiFe (Ni: 45 weight %; Fe: 55 weight %) that is a high saturation flux density material.

Next, as shown in FIGS. 25A and 25B, an insulating film 11 made of alumina, for example, is formed to a thickness of 0.2 µm on the first layer 10a. The insulating film 11 is then selectively etched to form openings in the insulating film 11 at positions where to form the second layer 10b and the third layer 10c.

Next, although not shown, an electrode film of a conductive material is formed to a thickness of 50 to 80 nm by sputtering, for example, so as to cover the first layer 10a and the insulating film 11. This electrode film functions as an electrode and a seed layer for plating. Then, although not shown, a frame to be used for forming a first coil 13 by frame plating is formed on the electrode film by photolithography.

Next, electroplating is performed using the electrode film, whereby the first coil 13 made of Cu, for example, is formed to a thickness of approximately 2.0 to 3.0 µm. The first coil 13 is placed in the region in which the insulating film 11 is located. In FIGS. 25A and 25B, the reference numeral 13a represents a connecting portion which lies near the inner end of the first coil 13 and is connected to a connecting layer 33a shown in FIG. 23. As shown in FIG. 23, a connecting portion 13b to be connected to a connecting layer 35a shown in FIG. 23 is provided near the outer end of the first coil 13. Next, the frame is removed, and then a portion of the electrode film other than the portion underlying the first coil 13 is removed by ion beam etching, for example.

Next, although not shown, a frame to be used for forming the second layer 10b and the third layer 10c by frame plating is formed on the first layer 10a and the insulating film 11 by photolithography.

Next, as shown in FIGS. 26A and 26B, electroplating is performed to form the second layer 10b and the third layer 10c, each made of a magnetic material, on the first layer 10a to a thickness of, for example, 2.5 to 3.5 µm each. For example, the material of the second layer 10b and the third layer 10c may be CoNiFe (Co: 67 weight %, Ni: 15 weight %, Fe: 18 weight %) having a saturation flux density of 1.8 to 1.9 T, or FeCo (Fe: approximately 60 weight %, Co: approximately 40 weight %) having a saturation flux density of 2.4 T. In the present embodiment, when the second layer 10b and the third layer 10c are formed by plating, no special electrode film is used but the unpatterned first layer 10a is used as an electrode and a seed layer for plating.

The second layer 10b is disposed near the region where to form the air bearing surface described later. The third layer 10c is a portion for connecting the first layer 10a and a top pole layer to be described later to each other, and is disposed near the center of the first coil 13.

Next, although not shown, a photoresist layer is formed to cover the first coil 13, the second layer 10b and the third layer 10c. Using this photoresist layer as a mask, the first layer 10a is selectively etched by ion beam etching, for example, to thereby pattern the first layer 10a.

Then, after removing the photoresist layer, an intercoil insulating film 14 made of alumina, for example, is formed to a thickness of 0.1 to 0.2 μm by CVD, for example, so as to cover the entire top surface of the laminate. The insulating film 14 may be a film formed by CVD, in which $H_2O$, $N_2$, $N_2O$, or $H_2O_2$ as a material for use in thin film formation and $Al(CH_3)_3$ or $AlCl_3$ as a material for use in thin film formation are ejected alternately and intermittently under reduced pressure at temperatures of 100° C. or higher, for example. According to this forming method, a plurality of thin alumina films are laminated into the insulating film 14 of desired thickness.

Next, as shown in FIGS. 27A and 27B, an insulating layer 15 made of photoresist, for example, is formed in a region where to form a second coil 18 to be described later. The insulating layer 15 is formed to fill at least a winding gap of the first coil 13. Part of the insulating layer 15 is disposed outside the outer periphery of the first coil 13 and inside the inner periphery of the same. Then, an insulating layer 16 made of alumina, for example, is formed to a thickness of 3 to 4 μm so as to cover the intercoil insulating film 14 and the insulating layer 15.

Next, as shown in FIGS. 28A and 28B, the insulating layers 15 and 16 are polished by, for example, CMP, so that the insulating layer 15 is exposed and the top surfaces of the insulating layers 15 and 16 are flattened.

Next, as shown in FIGS. 29A and 29B, after removing the insulating layer 15, a first conductive film of Ta or Ti is formed to a thickness of 10 to 20 nm by sputtering, for example, so as to cover the entire top surface of the laminate. On the first conductive film, a second conductive film made of Cu, for example, is formed by sputtering to a thickness of 50 nm, for example. On the second conductive film, a third conductive film made of Cu, for example, is formed by CVD to a thickness of 50 nm, for example. The third conductive film is not intended to fill the grooves between the turns of the first coil 13, but formed to cover the grooves by making use of the excellent step coverage of CVD. The three conductive films mentioned above will be referred to collectively as an electrode film 17. The electrode film 17 functions as an electrode and a seed layer for plating. On the electrode film 17, a conductive layer 18p made of Cu. for example, is formed by plating to a thickness of 3 to 4 μm, for example.

Next, as shown in FIGS. 30A and 30B, the conductive layer 18p is polished by, for example, CMP so that the second layer 10b, the third layer 10c, and the first coil 13 are exposed. Consequently, the conductive layer 18p remaining in such a groove as the winding gap of the first coil 13 makes the second coil 18. The foregoing polishing is performed so that the first coil 13 and the second coil 18 have a thickness of 2.0 to 2.5 μm, for example. As will be detailed later, the second coil 18 is connected to the first coil 13 so that the coils 13 and 18 constitute a continuous winding. As shown in FIG. 23, the second coil 18 has connecting portions 18a and 18b to be connected to connecting layers 34a and 33a, near its inner end and outer end, respectively.

In the step of forming the first coil 13 or the step of forming the second coil 18, two lead layers 36 and 37 are formed outside the first layer 10a of the bottom pole layer 10, as shown in FIG. 23. The lead layers 36 and 37 have connecting portions 36a and 37a to be connected to the connecting layers 34a and 35a, respectively.

As shown in FIGS. 31A and 31B, a coil coat insulating film 19 made of alumina, for example, is formed to a thickness of 0.1 to 0.3 μm to cover the entire top surface of the laminate. Then, the coil coat insulating film 19 is selectively etched to remove portions thereof corresponding to the second layer 10b, the third layer 10c, the two connecting portions 13a, 13b of the first coil 13, and the two connecting portions 18a, 18b of the second coil 18, the connecting portion 36a of the lead layer 36, and the connecting portion 37a of the lead layer 37. The coil coat insulating film 19 after the etching covers the top surfaces of the coils 13 and 18 except for the two connecting portions 13a, 13b of the first coil 13 and the two connecting portions 18a, 18b of the second coil 18.

Next, a magnetic layer 20 of a magnetic material is formed to a thickness of 0.8 to 1.2 μm by sputtering, so as to cover the entire top surface of the laminate. For example, the magnetic layer 20 is made of a metal magnetic material which contains at least iron among the group consisting of iron (Fe), nickel (Ni), and cobalt (Co). Such magnetic materials include NiFe, CoNiFe, FeCo, FeN, and CoFeN. Of these, Co-containing high saturation flux density materials such as CoNiFe having a saturation flux density of 1.8 to 1.9 T, and FeCo or CoFeN having a saturation flux density of 2.3 to 2.4 T are preferably used in the present embodiment.

Next, etching masks 21a, 21b, and 21c are formed on the magnetic layer 20 to a thickness of 1 to 2 μm each at portions corresponding to the second layer 10b, the third layer 10c, and the connecting portion 13a of the first coil 13, respectively. Here, although not shown, etching masks similar to the etching masks 21a, 21b, and 21c are also formed on the magnetic layer 20 at portions corresponding to the connecting portion 13b of the first coil 13, the two connecting portions 18a and 18b of the second coil 18, and the connecting portions 36a and 37a of the lead layers 36 and 37.

The above-mentioned etching masks may be made of a metal material. In this case, the etching masks may be formed by plating, or by frame plating in particular. The etching masks may also be made of a magnetic material different from the material constituting the magnetic layer 20. This magnetic material may be a Ni- or Fe-containing material such as NiFe and CoNiFe. The etching masks may also be made of a Ni-containing material such as Ni, NiCu, NiP, and NiB.

The material of the etching masks may also be an insulating material such as alumina. In this case, the etching masks are formed by sputtering, for example, using a photoresist layer as a mask.

Next, as shown in FIGS. 32A and 32B, the magnetic layer 20 is etched by reactive ion etching (hereinafter referred to as RIE) using the etching masks mentioned above. After the etching, portions of the magnetic layer 20 remaining under the etching masks 21a–21c make a fourth layer 10d, a fifth layer 10e, and a connecting portion layer 22. Similarly, portions of the magnetic layer 20 remaining under the five not-shown etching masks make five not-shown connecting portion layers. The fourth layer 10d lies on the second layer 10b, the fifth layer 10e lies on the third layer 10c, and the connecting portion layer 22 lies on the connecting portion 13a. The other five connecting portion layers lie on the connecting portions 13b, 18a, 18b, 36a, and 37a, respectively. The etching of the magnetic layer 20 may be effected by ion beam etching instead of RIE.

In the present embodiment, after the etching of the magnetic layer 20 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the sidewalls that have been formed by the RIE are slightly etched, it is possible to clean the surfaces of those sidewalls. Furthermore, molecules of the halogen-type gas such as chlorine molecules which have adhered to those sidewalls during the RIE can be removed, so that it is possible to protect those sidewalls from corrosion.

Furthermore, as shown in FIGS. 32A and 32B, the sidewalls of the fourth layer 10d make inclined surfaces such that each of the sidewalls of the fourth layer 10d forms an angle of smaller than 90° with the top surface of the base of the fourth layer 10d. Consequently, it is possible to prevent the magnetic flux passing through the bottom pole layer 10 from being saturated on the way and to thereby introduce the magnetic flux to the vicinity of a recording gap layer to be described later.

The end of the fourth layer 10d located farther from the air bearing surface defines the throat height of the recording head. The throat height is the length (height) of the magnetic pole portions, that is, the portions of the two pole layers opposed to each other with the recording gap layer in between, as taken from the air-bearing-surface-side end to the other end.

The third layer 10c and the fifth layer 10e constitute a coupling portion 31 for establishing magnetic coupling between the bottom pole layer 10 and the top pole layer.

Next, as shown in FIGS. 33A and 33B, an insulating layer 24 made of alumina, for example, is formed to a thickness of 1.5 to 2.0 μm so as to cover the entire top surface of the laminate. The insulating layer 24 is then polished by CMP, for example. This polishing is performed so as to remove the etching masks and to flatten the top surfaces of the fourth layer 10d, the fifth layer 10e, the connecting portion layer 22, the other five connecting portion layers, and the insulating layer 24.

Next, as shown in FIGS. 34A and 34B, the recording gap layer 25 is formed to a thickness of 0.06 to 0.08 μm so as to cover the entire top surface of the laminate. The recording gap layer 25 may be made of an insulating material such as alumina or a nonmagnetic metal material such as Ru, NiCu, and NiB. Then, portions of the recording gap layer 25 corresponding to the fifth layer 10e, the connecting portion layer 22 and the other five connecting portion layers are selectively etched.

Next, a magnetic layer 26 of a magnetic material is formed by, for example, sputtering, to a thickness of 0.5 to 1.2 μm so as to cover the entire top surface of the laminate. For example, the magnetic layer 26 is made of a metal magnetic material which contains at least iron among the group consisting of iron, nickel, and cobalt. Such magnetic materials include NiFe, CoNiFe, FeCo, FeN, and CoFeN. Of these, Co-containing high saturation flux density materials such as CoNiFe having a saturation flux density of 1.8 to 1.9 T and FeCo or CoFeN having a saturation flux density of 2.3 to 2.4 T, for example, are preferably used in the present embodiment.

Next, a second layer 27b of a top pole layer 27 to be described later, a connecting layer 33b, and connecting layers 34b, 35b shown in FIG. 23 are formed to a thickness of 1 to 2 μm on the magnetic layer 26 by frame plating, for example. The second layer 27b, the connecting layers 33b, 34b and 35b are made of a metal magnetic material different from the material constituting the magnetic layer 26, such as NiFe or CoNiFe. The second layer 27b is arranged to extend from a position corresponding to the fourth layer 10d of the bottom pole layer 10 to a position corresponding to the fifth layer 10e. The connecting layer 33b is formed to extend from a position corresponding to the connecting portion 13a to a position corresponding to the connecting portion 18b.

The connecting layer 34b is formed to extend from a position corresponding to the connecting portion 18a to a position corresponding to the connecting portion 36a. The connecting layer 35b is formed to extend from a position corresponding to the connecting portion 13b to a position corresponding to the connecting portion 37a.

Next, as shown in FIGS. 35A and 35B, the magnetic layer 26 is selectively etched by RIE using the second layer 27b and the connecting layers 33b, 34b and 35b as etching masks. Consequently, the magnetic layer 26 remaining after the etching makes a first layer 27a of the top pole layer 27 and the connecting layers 33a, 34a and 35a. The first layer 27a lies under the second layer 27b. The connecting layers 33a, 34a, and 35a lie under the connecting layers 33b, 34b, and 35b, respectively.

In the present embodiment, after the etching of the magnetic layer 26 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the sidewalls that have been formed by the RIE are slightly etched, it is possible to clean the surfaces of those sidewalls. Furthermore, molecules of the halogen-type gas such as chlorine molecules that have adhered to those sidewalls during the RIE can be removed, so that it is possible to protect those sidewalls from corrosion.

The top pole layer 27 has the first layer 27a that touches the recording gap layer 25, and the second layer 27b that is located on the first layer 27a. The top pole layer 27 also includes: a track width defining portion 27A having an end located at the air bearing surface and the other end located away from the air bearing surface: and a yoke portion 27B (see FIG. 39 and FIG. 40) connected to the other end of the track width defining portion 27A. The yoke portion 27B has a width which is equal to that of the track width defining portion 27A at the interface with the track width defining portion 27A. The width of the yoke portion 27B gradually increases from this interface with an increase in distance from the track width defining portion 27A, and finally becomes constant. The track width defining portion 27A is the magnetic pole portion of the top pole layer 27, and defines the recording track width. When forming the first layer 27a by RIE, the track width defining portion 27A; is given an initial width of the order of 0.1 to 0.2 μm. Here, by way of example, the track width defining portion 27A initially has a width of 0.15 μm.

Next, as shown in FIGS. 36A and 36B, the sidewalls of the track width defining portion 27A of the top pole layer 27 are etched by, for example, ion beam etching, so that the width of the track width defining portion 27A is reduced to 0.1 μm, for example. For example, this etching is performed so that ion beams travel at an angle of 40 to 50° with respect to a direction perpendicular to the top surface of the first layer 10a.

Next, although not shown, a photoresist mask having an opening around the track width defining portion 27A is formed. Then, as shown in FIGS. 37A and 37B, the recording gap layer 25 around the track width defining portion 27A is etched by, for example, RIE with a mixed gas of $Cl_2$ and $BCl_3$ as the etching gas, or ion beam etching, using the above-mentioned photoresist mask and the top pole layer 27 as masks.

Then, the top pole layer 27, the recording gap layer 25 lying below the same, and the above-mentioned photoresist mask are used as masks to etch part of the fourth layer 10d of the bottom pole layer 10 at around the track width defining portion 27A by ion beam etching, for example. The etching depth of the fourth layer 10d is 0.17 to 0.22 μm, for example. This etching may be effected by combining an ion beam etching in which Ion beams travel at an angle of 0° with respect to the direction perpendicular to the top surface of the first layer 10a with an ion beam etching in which the above-mentioned angle is 45°. To etch the fourth layer 10d by focused ion beam etching, the ion beam etching may be performed so that the above-mentioned angle falls within the range of 40° to 75°. Also, for the purpose of slightly etching the sidewalls of the fourth layer 10d or eliminating etching residuals of FeCo and the like resulting from the RIE, ion beam etching may be performed so that the above-mentioned angle falls within the range of 40° to 75°. Here, by way of example, the ion beam etching is performed so that the above-mentioned angle falls within the range of 40° to 50°. The fourth layer 10d may be etched by RIE under the same conditions as those for the magnetic layer 26, instead of the ion beam etching.

A trim structure as shown in FIG. 37B is thereby formed. The trim structure suppresses an increase in the effective recording track width due to expansion of a magnetic flux generated during writing in a narrow track. A portion of the fourth layer 10d, the portion opposed to the track width defining portion 27A of the top pole layer 27 with the recording gap layer 25 in between, is the magnetic pole portion of the bottom pole layer 10.

The fourth layer 10d yet to be etched has a thickness greater than the etching depth of the fourth layer 10d. Consequently, the trim structure can be formed while preventing the magnetic flux passing through the bottom pole layer 10 from being saturated before it reaches the air bearing surface.

Next, as shown in FIGS. 38A and 38B, an overcoat layer 29 of alumina, for example, is formed to a thickness of 20 to 30 μm so as to cover the entire top surface of the laminate. Its surface is flattened, and not-shown electrode pads are formed thereon. Finally, a slider including the foregoing layers is lapped to form the air bearing surface 30. A thin-film magnetic head including the recording and reproducing heads is thereby completed.

Now, description will be given in detail of the method of etching the magnetic layers 20 and 26 in the present embodiment. In the present embodiment, the layers to be etched (magnetic layers 20 and 26) are etched by RIE using etching gas that contains halogen-type gas and $O_2$ or $CO_2$. Examples of halogen-type gas available include ones containing at least either of $Cl_2$ and $BCl_3$. Among examples of the etching gas are ones containing $Cl_2$ and $CO_2$, ones containing $BCl_3$, $Cl_2$ and $CO_2$, and ones containing $BCl_3$, $Cl_2$ and $O_2$.

During the etching, the layers to be etched are preferably kept at or above 50° C. in temperature for the sake of higher etching rates. If the MR element 5 is a spin-valve GMR element, the layers to be etched are preferably controlled to or below 350° C. in temperature during the etching in order to prevent deterioration in capability of an antiferromagnetic layer of the GMR element. It is particularly preferable that the layers to be etched fall within the range of 200 to 300° C. in temperature during the etching. When the RIE is performed at such high temperatures using etching masks made of Ni-containing material such as NiFe, it is possible to prevent adhesion of Ni molecules separating from the etching masks to the sidewalls of the layers to be etched.

According to the above-described etching method, it is possible to etch the magnetic layers 20 and 26 in a short time and to precisely control the profiles of the layers 10d and 27a that are made of the etched magnetic layers 20 and 26, respectively.

Etching of the fourth layer 10d of the bottom pole layer 10 for the purpose of forming the trim structure may be performed by the same method as that for etching the magnetic layers 20 and 26.

The thin-film magnetic head according to the present embodiment has the air bearing surface 30 serving as a medium facing surface that faces toward a recording medium, and the reproducing head and the recording head (induction-type electromagnetic transducer).

The reproducing head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. Portions of the bottom and top shield layers 3 and 8 located on a side of the air bearing surface 30 are opposed to each other with the MR element 5 in between.

The recording head comprises: the bottom pole layer 10 and the top pole layer 27 that are magnetically coupled to each other and that includes the magnetic pole portions opposed to each other and located in regions of the pole layers on the side of the air bearing surface 30; the recording gap layer 25 interposed between the magnetic pole portion of the bottom pole layer 10 and the magnetic pole portion of the top pole layer 27; and the coils 13 and 18, at least part of each of the coils being disposed between the bottom and top pole layers 10 and 27 and insulated from the bottom and top pole layers 10 and 27. The bottom pole layer 10 and the top pole layer 27 of the present embodiment correspond to the first pole layer and the second pole layer of the invention, respectively.

The bottom pole layer 10 includes the first to fifth layers 10a–10e. The first layer ba is located to face toward the coils 13 and 18. The second layer 10b is located closer to the air bearing surface 30 than the coils 13 and 18 are, and connected to the surface of the first layer 10a that is closer to the recording gap layer 25. The fourth layer 10d has two surfaces one of which is connected to the surface of the second layer 10b closer to the recording gap layer 25, and the other of which is adjacent to the recording gap layer 25. The third layer 10c is located on the first layer 10a at a position away from the air bearing surface 30. The fifth layer 10e is located on the third layer 10c. The third layer 10c and the fifth layer 10e constitute the coupling portion 31 (see FIG. 23) for establishing magnetic coupling between the bottom pole layer 10 and the top pole layer 27. The shape of the coupling portion 31 is the same as that of the coupling portion 131 of the first embodiment. More specifically, the coupling portion 31 has an end face 32 that faces toward the air bearing surface 30. This end face 32 includes a curved surface convex toward the air bearing surface 30. For example, this end face 32 is shaped like a part of a cylindrical surface.

The top pole layer 27 has the first layer 27a and the second layer 27b both of which are flat. FIGS. 39 and 40 show the track width defining portion 27A and the yoke portion 27B of the top pole layer 27. FIG. 39 shows the case where the top surface of the coupling portion 31 is the same in shape as the top surface of the coupling portion 131 shown in FIG. 18. FIG. 40 shows the case where the top surface of the coupling portion 31 is the same in shape as the top surface of the coupling portion 131 shown in FIG. 16.

As shown in FIG. 23, the thin-film coil of the present embodiment includes the first coil 13 and the second coil 18. The first coil 13 has a winding a part of which is disposed between the second layer 10b of the bottom pole layer 10 and the third layer 10c of the bottom pole layer 10. The second coil 18 has a winding at least a part of which is disposed in the winding gap of the first coil 13. Part of the winding of the second coil 18 is also disposed between the second layer 10b and the third layer 10c. The coils 13 and 18 both have the shape of a flat spiral, being disposed around the coupling portion 31.

The connecting portion 13b of the first coil 13 is connected to the lead layer 37 through the connecting layers 35a and 35b. The connecting portion 13a of the first coil 13 is connected to the connecting portion 18b of the second coil 18 through the connecting layers 33a and 33b. The connecting portion 18a of the second coil 18 is connected to the lead layer 36 through the connecting layers 34a and 34b. Consequently, the coils 13 and 18 form a continuous winding. This winding has four or more turns. Here, by way of example, this winding shall have seven turns.

In the present embodiment, a portion of the thin-film coil including the coils 13 and 18 located near the end face 32 of the coupling portion 31 has the same shape as that for the case of the thin-film 114 of the first embodiment. In the present embodiment, the minimum width of the thin-film coil is 0.5 $\mu$m, for example. The interval between adjoining turns of the thin-film coil (adjoining turns of the coil 13 and the coil 18) is 0.1 $\mu$m, for example.

According to the present embodiment, the first coil 13 is formed on the first layer 10a that has a wholly flat top surface. The first coil 13 can thus be formed thickly and finely with high precision. In addition, according to the present embodiment, the second coil 18 is formed so that at least part of the winding thereof is disposed in the winding gap of the first coil 13. Hence, the second coil 18 can also be formed thickly and finely with high precision. According to the present embodiment, the winding of the first coil 13 and the winding of the second coil 18 are separated from each other by the thin intercoil insulating film 14. This allows an extremely small spacing between the winding of the first coil 13 and that of the second coil 18. Consequently, according to the present embodiment, it is possible to reduce the winding pitches of the coils 13 and 18 significantly while making the coils 13 and 18 thick. For example, according to the present embodiment, the coils 13 and 18 can be made greater than or equal to 1.5 $\mu$m in thickness while the winding pitches of the coils 13 and 18 between the second layer 10b and the third layer 10c are reduced to or below 0.5 $\mu$m or 0.3 $\mu$m. According to the present embodiment, it is therefore possible to shorten the magnetic path length and reduce the resistance of the thin-film coil as compared with the first embodiment.

In the present embodiment, when a high saturation flux density material is used as the material of the second and fourth layers 10b and 10d of the bottom pole layer 10 and the top pole layer 27, magnetic flux saturation in the middle of the magnetic path can be avoided. As result, magnetomotive forces occurring in the coils 13 and 18 can be effectively utilized for recording.

For example, U.S. Pat. No. 6,043,959 discloses a thin-film magnetic head in which the top pole layer includes a pole portion layer of a small width and a yoke portion layer of a great width that is connected to the top surface of the pole portion layer. In such a thin-film magnetic head, the following problems arise when the recording track width is small, in particular. Specifically, in this kind of thin-film magnetic head, the cross-sectional area of the magnetic path abruptly decreases in the portion connecting the pole portion layer to the yoke portion layer. As a result, a magnetic flux may be saturated in this portion, which can hamper sufficient transmission of the magnetic flux from the yoke portion layer to the pole portion layer. Hence, the thin-film magnetic head may deteriorate in overwrite property.

Besides, the foregoing thin-film magnetic head in which the top pole layer includes the pole portion layer and the yoke portion layer, a magnetic flux leaks from the yoke portion layer toward the recording medium and, as a result, so-called side write may be caused by yoke portion layer that is great in width. That is, the yoke portion layer may cause data to be written in a region of the recording medium where data is not supposed to be written. In this case, the effective track width may become greater than a desired track width. In addition, since the positional relationship between the pole portion layer and the yoke portion layer is determined by alignment in photolithography, the actual positional relationship between the two layers may be off a desired relationship. This can make the occurrences of side write more striking.

In contrast, according to the present embodiment, no magnetic flux saturation occurs in the portion connecting the pole portion layer to the yoke portion layer because the top pole layer 27 that defines a track width is a flat layer. Consequently, according to the embodiment, there will occur none of such problems as mentioned above, that is, deterioration in overwrite property and side write attributed to the yoke portion layer.

In the present embodiment, the flat top pole layer 27 is formed on a flat base. Therefore, according to the embodiment, the track width defining portion of the top pole layer 27 can be formed finely with high precision. As a result, it becomes possible to achieve, for example, a track width of 0.2 $\mu$m or less which has been heretofore difficult in the case of mass-producing thin-film magnetic heads.

The remainder of the configuration, functions and effects of the present embodiment are the same as those of the first embodiment.

[Third Embodiment]

Now, a thin-film magnetic head and a method of manufacturing the same according to a third embodiment of the invention will be described with reference to FIGS. 41A to 52A and FIGS. 41B to 52B. FIGS. 41A to 52A are cross sections each orthogonal to the air bearing surface and the top surface of the substrate. FIGS. 41B to 52B are cross sections of the magnetic pole portion each parallel to the air bearing surface.

The manufacturing method of the present embodiment is the same as that of the second embodiment up to the step of forming the intercoil insulating film 14.

Figure 41A:
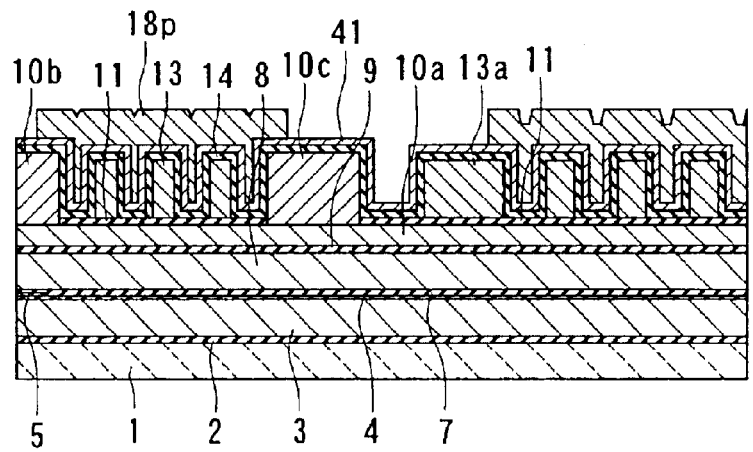
FIGS. 41A and 41B are cross sections for illustrating a step in a method of manufacturing a thin-film magnetic head according to a third embodiment of the invention.
Figure 41B:
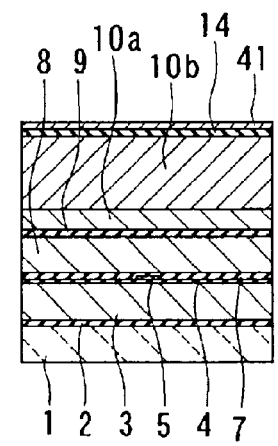

Then, in the present embodiment, as shown in FIGS. 41A and 41B, a first conductive film made of Cu. for example, is formed to a thickness of, for example, 50 nm by sputtering, so as to cover the entire top surface of the laminate. On the first conductive film, a second conductive film made of Cu, for example, is formed by CVD to a thickness of 50 nm, for example. The second conductive film is not intended to fill the grooves between the turns of the first coil 13, but is formed to cover the grooves by making use of the excellent step coverage of CVD. The two conductive films mentioned above will be referred to collectively as an electrode film 41. The electrode film 41 functions as an electrode and a seed layer for plating. On the electrode film 41, the conductive layer 18p made of Cu, for example, is formed by plating to a thickness of 2 to 3 $\mu$m, for example.

Figure 42A:
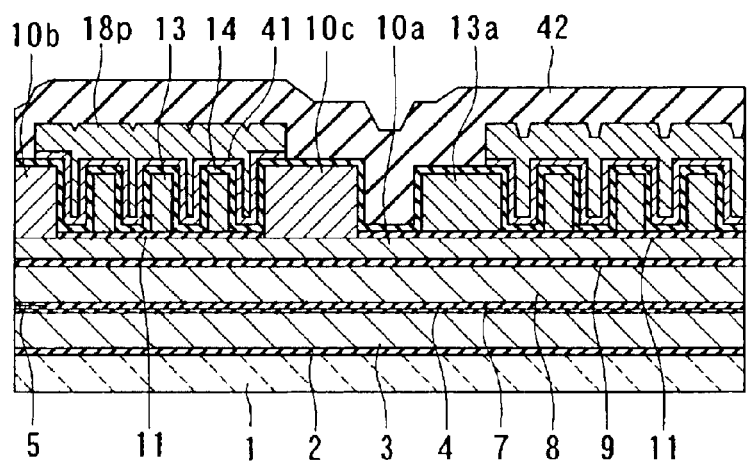
FIGS. 42A and 42B are cross sections for illustrating a step that follows FIGS. 41A and 41B.
Figure 42B:
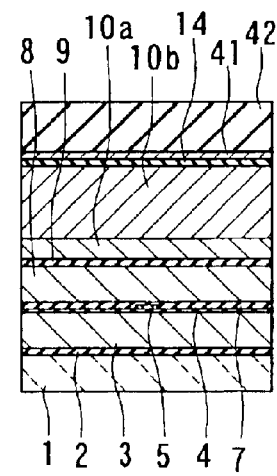

Next, as shown in FIGS. 42A and 42B, a portion of the electrode film 41 other than the portion underlying the conductive layer 18p is removed by, for example, ion beam etching. An insulating layer 42 made of alumina, for example, is formed to a thickness of 3 to 4 µm so as to cover the entire top surface of the laminate.

Next, as shown in FIGS. 43A and 43B, the conductive layer 18p is polished by, for example, CMP, so that the second layer 10b, the third layer 10c, and the first coil 13 are exposed. Consequently, the conductive layer 18p remaining in such a groove as the winding gap of the first coil 13 makes the second coil 18. The foregoing polishing is performed so that the first coil 13 and the second coil 18 have a thickness of 2.0 to 3.0 µm, for example. As in the second embodiment, the second coil 18 is connected to the first coil 13 so that the coils 13 and 18 constitute a continuous winding. Additionally, as in the second embodiment, the second coil 18 has the connecting portions 13a and 18b to be connected to the connecting layers 34a and 33a, near its inner end and outer end, respectively.

As in the second embodiment, in the step of forming the first coil 13 or the step of forming the second coil 18, two lead layers 36 and 37 are formed outside the first layer 10a of the bottom pole layer 10, as shown in FIG. 23. The lead layers 36 and 37 have connecting portions 36a and 37a to be connected to the connecting layers 34a and 35a, respectively.

As shown in FIGS. 44A and 44B, a coil coat insulating film 19 made of alumina, for example, is formed to a thickness of 0.1 to 0.3 µm to cover the entire top surface of the laminate. Then, the coil coat insulating film 19 is selectively etched to remove portions thereof corresponding to the second layer 10b, the third layer 10c, the two connecting portions 13a, 13b of the first coil 13, and the two connecting portions 18a, 18b of the second coil 18, the connecting portion 36a of the lead layer 36, and the connecting portion 37a of the lead layer 37. The coil coat insulating film 19 after the etching covers the top surfaces of the coils 13 and 18 except for the two connecting portions 13a, 13b of the first coil 13 and the two connecting portions 18a, 18b of the second coil 18.

Next, a magnetic layer 20 of a magnetic material is formed to a thickness of 0.8 to 1.2 µm by sputtering so as to cover the entire top surface of the laminate. The material of the magnetic layer 20 is the same as that in the second embodiment.

Next, CMP stopper films 43a, 43b, and 43c each made of Ta or Ti, for example, are formed on the magnetic layer 20 to a thickness of 10 to 20 nm each at portions corresponding to the second layer 10b, the third layer 10c, and the connecting portion 13a of the first coil 13, respectively. Here, although not shown, CMP stopper films similar to the CMP stopper films 43a, 43b, and 43c are also formed on the magnetic layer 20 at portions corresponding to the connecting portion 13b of the first coil 13, the two connecting portions 18a and 18b of the second coil 18, and the connecting portions 36a and 37a of the lead layers 36 and 37.

Next, etching masks 21a, 21b, and 21c are formed to a thickness of 1 to 2 µm each on the CMP stopper films 43a, 43b, and 43c, respectively. Here, although not shown, etching masks similar to the etching masks 21a, 21b, and 21c are also formed on the other CMP stopper films. The CMP stopper films are formed by sputtering, for example. The material and the method of forming the etching masks are the same as in the second embodiment.

Next, as shown in FIGS. 45A and 45B, the magnetic layer 20 is etched by RIE using the etching masks mentioned above. After the etching, the magnetic layer 20 remaining under the etching masks 21a–21c makes the fourth layer 10d, the fifth layer 10e, and the connecting portion layer 22. Similarly, the magnetic layer 20 remaining under the five not-shown etching masks makes five not-shown connecting portion layers. The fourth layer 10d lies on the second layer 10b, the fifth layer 10e lies on the third layer 10c, and the connecting portion layer 22 lies on the connecting portion 13a. The other five connecting portion layers lie on the connecting portions 13b, 18a, 18b, 36a, and 37a, respectively. Incidentally, ion beam etching may be used instead of RIE to etch the magnetic layer 20. The third layer 10c and the fifth layer 10e constitute the coupling portion 31 for establishing magnetic coupling between the bottom pole layer 10 and the top pole layer.

Next, as shown in FIGS. 46A and 46B, the insulating layer 24 made of alumina, for example, is formed to a thickness of 1.5 to 2.0 µm so as to cover the entire top surface of the laminate. Then, the insulating layer 24 is polished by CMP. This polishing is performed so as to remove the etching masks and to flatten the top surfaces of the fourth layer 10d, the fifth layer 10e, the connecting portion layer 22, the other five connecting portion layers, and the insulating layer 24. At this time, a position to stop the CMP is determined by using the CMP stopper films.

Next, as shown in FIGS. 47A and 47B, the recording gap layer 25 made of an insulating material such as alumina is formed to a thickness of 0.06 to 0.08 µm so as to cover the entire top surface of the laminate.

Next, as shown in FIGS. 48A and 48B, portions of the recording gap layer 25 corresponding to the fifth layer 10e, the connecting portion layer 22 and the other five connecting portion layers are selectively etched.

Next, the magnetic layer 26 of a magnetic material is formed by sputtering, for example, to a thickness of 0.5 to 1.0 µm so as to cover the entire top surface of the laminate. The magnetic layer 26 is made of the same material as in the second embodiment.

Next, the second layer 27b of the top pole layer 27, the connecting layer 33b, and the connecting layers 34b and 35b shown in FIG. 23 are formed on the magnetic layer 26 by frame plating, for example, to a thickness of 1 to 2 µm, for example. The materials and arrangement of these layers are the same as in the second embodiment.

Next, as shown in FIGS. 49A and 49B, the magnetic layer 26 is selectively etched by RIE using the second layer 27b and the connecting layers 33b, 34b, and 35b as etching masks. Consequently, portions of the magnetic layer 26 remaining after the etching make the first layer 27a of the top pole layer 27 and the connecting layers 33a, 34a, and 35a. The first layer 27a lies under the second layer 27b. The connecting layers 33a, 34a, and 35a lie under the connecting layers 33b, 34b, and 35b, respectively.

As in the second embodiment, the top pole layer 27 has the first layer 27a and the second layer 27b. The top pole layer 27 also includes the track width defining portion 27A and the yoke portion 27B. When forming the first layer 27a by RIE, the track width defining portion 27A is given an initial width on the order of 0.1 to 0.2 µm.

Next, as shown in FIGS. 50A and 50B, the sidewalls of the track width defining portion 27A of the top pole layer 27 are etched by, for example, ion beam etching, so that the width of the track width defining portion 27A is made 0.1 µm, for example. This etching is performed in the same way as in the second embodiment.

Next, although not shown, a photoresist mask having an opening around the track width defining portion 27A is formed. As shown in FIGS. 51A and 51B, the recording gap layer 25 around the track width defining portion 27A is etched, for example, by RIE with a mixed gas of $Cl_2$ and $BCl_3$ as the etching gas, using the above-mentioned photoresist mask and the top pole layer 27 as masks.

Next, the above-mentioned photoresist mask and the top pole layer 27 are used as masks to etch part of the fourth layer 10d of the bottom pole layer 10 at around the track width defining portion 27A by ion beam etching, for example. This etching is performed in the same way as in the second embodiment. A trim structure as shown in FIG. 51B is thereby formed.

Next, as shown in FIGS. 52A and 52B, the overcoat layer 29 made of alumina, for example, is formed to a thickness of 20 to 30 μm so as to cover the entire top surface of the laminate. Its surface is flattened, and not-shown electrode pads are formed thereon. Finally, a slider including the foregoing layers is lapped to form the air bearing surface 30. A thin-film magnetic head including the recording and reproducing heads is thereby completed.

In the present embodiment, the magnetic layers 20 and 26 are etched by the same RIE-based method as in the second embodiment.

The remainder of the configuration, functions and effects of the present embodiment are the same as those of the second embodiment.

The present invention is not limited to the foregoing embodiments but may be practiced in still other ways. For example, the invention is also applicable to a thin-film magnetic head dedicated to recording that has an induction-type electromagnetic transducer only, or a thin-film magnetic head that performs recording and reproducing operations with an induction-type electromagnetic transducer.

As has been described, in the thin-film magnetic head of the invention, the coupling portion for establishing magnetic coupling between the first pole layer and the second pole layer has an end face facing toward the medium facing surface, and this end face includes a curved surface convex toward the medium facing surface. A part of the thin-film coil is disposed between the end face of the coupling portion and the medium facing surface, and has a minimum width of the thin-film coil in a position on a virtual line connecting the end face of the coupling portion and the medium facing surface in the shortest distance. The part of the thin-film coil includes a variable width portion that increases in width with distance from the virtual line. Consequently, according to the thin-film magnetic head of the invention, it is possible to reduce the resistance of the thin-film coil while shortening the magnetic path length of the thin-film magnetic head. Thus, according to the invention, it is possible to achieve a thin-film magnetic head which is small in magnetic path length and thus excellent in recording characteristics at high frequency bands, and which also has a thin-film coil of small resistance.

In the thin-film magnetic head of the invention, the length of the coupling portion in a direction perpendicular to the medium facing surface may be greater than the width of the coupling portion. In this case, it is possible to make the resistance of the thin-film coil even smaller.

In the thin-film magnetic head of the invention, the first pole layer may have a first layer opposed to the thin-film coil, a second layer connected to the first layer near the medium facing surface, and a third layer connected to the first layer, the third layer including at least part of the coupling portion. The thin-film coil may include a first coil having a winding disposed in part between the second layer and the third layer, and a second coil having a winding disposed at least in part in a winding gap of the first coil. In this case, the winding pitch of the thin-film coil can be made smaller while the thickness of the thin-film coil can be made greater. Thus, in this case, it is possible to make the magnetic path length even smaller and to make the resistance of the thin-film coil even smaller as well.

According to the method of manufacturing a thin-film magnetic head of the invention, the coupling portion for establishing magnetic coupling between the first pole layer and the second pole layer is formed so that the coupling portion has an end face that faces toward the medium facing surface, and that the end face includes a curved surface convex toward the medium facing surface. In the method of manufacturing a thin-film magnetic head, a part of the thin-film coil is disposed between the end face of the coupling portion and the medium facing surface, and has a minimum width of the thin-film coil in a position on a virtual line connecting the end face of the coupling portion and the medium facing surface in the shortest distance. The part of the thin-film coil includes a variable width portion that increases in width with distance from the virtual line. Consequently, according to the thin-film magnetic head of the invention, it is possible to reduce the resistance of the thin-film coil while shortening the magnetic path length of the thin-film magnetic head. Thus, according to the invention, it is possible to achieve a thin-film magnetic head which is small in magnetic path length and thus excellent in recording characteristics at high frequency bands, and which also has a thin-film coil of small resistance.

In the method of manufacturing a thin-film magnetic head of the invention, the first pole layer may have a first layer opposed to the thin-film coil, a second layer connected to the first layer near the medium facing surface, and a third layer connected to the first layer, the third layer including at least part of the coupling portion. The thin-film coil may include a first coil having a winding disposed in part between the second layer and the third layer, and a second coil having a winding disposed at least in part in a winding gap of the first coil. In this case, the winding pitch of the thin-film coil can be made smaller while the thickness of the thin-film coil can be made greater. Thus, in this case, it is possible to make the magnetic path length even smaller and to make the resistance of the thin-film coil even smaller as well.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   first and second pole layers that include magnetic pole portions opposed to each other and located in regions of the pole layers on a side of the medium facing surface;
   a coupling portion for establishing magnetic coupling between the first pole layer and the second pole layer, the coupling portion being located away from the medium facing surface and including at least either one of a part of the first pole layer and a part of the second pole layer;
   a gap layer interposed between the magnetic pole portion of the first pole layer and the magnetic pole portion of the second pole layer; and
   a thin-film coil of flat spiral shape, disposed around the coupling portion, at least part of the thin-film coil being interposed between the first and second pole layers and insulated from the first and second pole layers, wherein:
   the coupling portion has an end face facing toward the medium facing surface, the end face including a curved surface convex toward the medium facing surface, and a part of the thin-film coil is disposed between the end face of the coupling portion and the medium facing surface, has a minimum width of the thin-film coil in a position on a virtual line connecting the end face of the coupling portion and the medium facing surface in the shortest distance, and includes a variable width portion that increases in width with distance from the virtual line.

2. A thin-film magnetic head according to claim 1, wherein the end face of the coupling portion has a shape of a part of a cylindrical surface.

3. A thin-film magnetic head according to claim 1, wherein a length of the coupling portion in a direction perpendicular to the medium facing surface is greater than a width of the coupling portion.

4. A thin-film magnetic head according to claim 1, wherein an inner periphery and an outer periphery of the variable width portion are both shaped into an arc, the outer periphery being greater than the inner periphery in the radius of curvature.

5. A thin-film magnetic head according to claim 1, wherein the thin-film coil has four or more turns.

6. A thin-film magnetic head according to claim 5, wherein:
   the first turn and the second turn of the thin-film coil from the inner side include a first portion and a second portion, respectively, the first and second portions being disposed between the end face of the coupling portion and the medium facing surface; and
   of the first portion and the second portion, at least the first portion becomes minimum in width in the position on the virtual line connecting the end face of the coupling portion and the medium facing surface in the shortest distance, and increases in width with distance from the virtual line.

7. A thin-film magnetic head according to claim 6, wherein:
   an inner periphery of the first portion has a shape of an arc having a first radius of curvature;
   an outer periphery of the first portion has a shape of an arc having a second radius of curvature greater than the first radius of curvature;
   an inner periphery of the second portion has a shape of an arc having a third radius of curvature greater than the second radius of curvature; and
   an outer periphery of the second portion has a shape of an arc having a fourth radius of curvature greater than the third radius of curvature.

8. A thin-film magnetic head according to claim 6, wherein:
   an inner periphery of the first portion has a shape of an arc having a first radius of curvature;
   an outer periphery of the first portion has a shape of an arc having a second radius of curvature greater than the first radius of curvature;
   an inner periphery of the second portion has a shape of an arc having a third radius of curvature greater than the second radius of curvature, and
   an outer periphery of the second portion includes a linear portion and two arc portions connected to respective ends of the linear portion, the linear portion being located in a predetermined region covering the position on the virtual line, the two arc portions having a fourth radius of curvature greater than the third radius of curvature.

9. A thin-film magnetic head according to claim 6, wherein:
   an inner periphery of the first portion has a shape of an arc having a first radius of curvature;
   an outer periphery of the first portion includes a first linear portion and two arc portions connected to respective ends of the first linear portion, the first linear portion being located in a predetermined region covering the position on the virtual line, the two arc portions having a second radius of curvature greater than the first radius of curvature;
   an inner periphery of the second portion includes a second linear portion and two arc portions connected to respective ends of the second linear portion, the second linear portion being located in a predetermined region covering the position on the virtual line, the two arc portions having a third radius of curvature greater than the second radius of curvature;
   an outer periphery of the second portion includes a third linear portion and two arc portions connected to respective ends of the third linear portion, the third linear portion being located in a predetermined region covering the position on the virtual line, the two arc portions having a fourth radius of curvature greater than the third radius of curvature; and
   the second linear portion has a length greater than or equal to that of the first linear portion, and the third linear portion is longer than the second linear portion.

10. A thin-film magnetic head according to claim 6, wherein:
    each of the turns of the thin-film coil other than the first turn from the inner side includes a portion of constant width located in a predetermined region covering the position on the virtual line; and
    the outer the turns are, the longer the portions of constant width are.

11. A thin-film magnetic head according to claim 6, wherein:
    each of the turns of the thin-film coil other than the first and second turns from the inner side includes a portion of constant width located in a predetermined region covering the position on the virtual line; and
    the outer the turns are, the longer the portions of constant width are.

12. A thin-film magnetic head according to claim 1, wherein:
    the second pole layer has a pole portion layer including the magnetic pole portion of the second pole layer, a coupling layer including at least part of the coupling portion, and a yoke portion layer for coupling the pole portion layer and the coupling layer; and
    the part of the thin-film coil is disposed between the pole portion layer and the coupling layer.

13. A thin-film magnetic head according to claim 1, wherein:
    the first pole layer has a first layer opposed to the thin-film coil, a second layer connected to the first layer near the medium facing surface, and a third layer connected to the first layer, the third layer including at least part of the coupling portion; and
    the part of the thin-film coil is disposed between the second layer and the third layer.

14. A thin-film magnetic head according to claim 13, wherein the thin-film coil includes a first coil having a winding disposed in part between the second layer and the third layer, and a second coil having a winding disposed at least in part in a winding gap of the first coil.

15. A thin-film magnetic head according to claim 13, wherein the second pole layer is a flat layer.

16. A method of manufacturing a thin-film magnetic head comprising:

a medium facing surface that faces toward a recording medium;

first and second pole layers that include magnetic pole portions opposed to each other and located in regions of the pole layers on a side of the medium facing surface:

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil of flat spiral shape, disposed around the coupling portion, at least part of the thin-film coil being interposed between the first and second pole layers and insulated from the first and second pole layers, the method comprising the steps of:

forming the first pole layer;

forming the thin-film coil on the first pole layer;

forming the gap layer on the magnetic pole portion of the first pole layer;

forming the second pole layer on the gap layer and the thin-film coil, wherein:

one of the step of forming the first pole layer and the step of forming the second pole layer includes the step of forming the coupling portion so that the coupling portion has an end face facing toward, the medium facing surface and the end face includes a curved surface convex toward the medium facing surface, and a part of the thin-film coil is disposed between the end face of the coupling portion and the medium facing surface, has a minimum width of the thin-film coil in a position on a virtual line connecting the end face of the coupling portion and the medium facing surface in the shortest distance, and includes a variable width portion that increases in width with distance from the virtual line.

17. A method of manufacturing a thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil of flat spiral shape, disposed around the coupling portion, at least part of the thin-film coil being interposed between the first and second pole layers and insulated from the first and second pole layers, the first pole layer having a first layer opposed to the thin-film coil, a second layer connected to the first layer near the medium facing surface, and a third layer connected to the first layer, the third layer including at least part of the coupling portion, the thin-film coil including a first coil having a winding disposed in part between the second layer and the third layer, and a second coil having a winding disposed at least in part in a winding gap of the first coil, the method comprising the steps of:

forming the first layer;

forming the first coil on the first layer;

forming the second layer and the third layer on the first layer after the formation of the first coil;

forming the second coil so that the second coil is disposed at least in part in the winding gap of the first coil;

forming the gap layer; and forming the second pole layer on the gap layer, the first coil, and the second coil, wherein:

the coupling portion has an end face facing toward the medium facing surface, the end face including a curved surface convex toward the medium facing surface, and a part of the first coil and a part of the second coil are both disposed between the end face of the coupling portion and the medium facing surface, have a minimum width of the thin-film coil in a position on a virtual line connecting the end face of the coupling portion and the medium facing surface in the shortest distance, and include respective variable width portions that increase in width with distance from the virtual line.

* * * * *